US009992722B2

(12) United States Patent
Li et al.

(10) Patent No.: US 9,992,722 B2
(45) Date of Patent: Jun. 5, 2018

(54) RECONFIGURABLE MULTI-MODE AND MULTI-BANDS RADIO ARCHITECTURE AND TRANSCEIVER

(71) Applicant: HUAWEI TECHNOLOGIES CANADA CO., LTD., Kanata (CA)

(72) Inventors: Lin Li, Lachine (CA); Jaber Moghaddasi, Montreal (CA); Kuangda Wang, Montreal (CA); Ke Wu, Montreal (CA)

(73) Assignee: HUAWEI TECHNOLOGIES CANADA CO., LTD., Kanata, Ontario (CA)

( * ) Notice: Subject to any disclaimer, the term of this patent is extended or adjusted under 35 U.S.C. 154(b) by 206 days.

(21) Appl. No.: 14/967,652

(22) Filed: Dec. 14, 2015

(65) Prior Publication Data
US 2017/0171791 A1 Jun. 15, 2017

(51) Int. Cl.
H04B 7/212 (2006.01)
H04W 36/30 (2009.01)
(Continued)

(52) U.S. Cl.
CPC .............. *H04W 36/30* (2013.01); *H04B 1/04* (2013.01); *H04B 1/30* (2013.01); *H04B 1/403* (2013.01);
(Continued)

(58) Field of Classification Search
CPC ..... H04W 36/30; H04W 24/08; H04W 88/06; H04B 1/04; H04B 1/30; H04B 1/403; H04B 2001/307; H04L 5/14
See application file for complete search history.

(56) References Cited

U.S. PATENT DOCUMENTS 5,881,369 A 3/1999 Dean et al.
6,535,748 B1 3/2003 Vuorio et al.
(Continued)

FOREIGN PATENT DOCUMENTS

CN 104883198 A 9/2015
EP 0841756 A2 5/1998
(Continued)

OTHER PUBLICATIONS

C. A. Hoer and K. C. Roe, "Using an arbitrary six-port junction to measure complex voltage ratios," IEEE Trans. Microwave Theory Tech., vol. MTT-23, pp. 978-984, Dec. 1975.

Primary Examiner — Phuc Tran
(74) Attorney, Agent, or Firm — Norton Rose Fulbright Canada LLP; Maya Medeiros

(57) ABSTRACT

A transceiver with a spectrum sensing unit configured to detect, within a plurality of millimeter wave bands, one or more channels with tolerably low interference for selection. The transceiver has a transmitter configured to modulate a transmit signal to an output transmit signal using a transmit carrier frequency compatible with a transmit channel selected from the one or more channels, and using a transmit duplexing operating mode compatible with a transmit millimeter wave of the plurality of millimeter wave bands that correspond to the transmit channel. The transceiver has a receiver configured to demodulate a receive signal from an input receive signal using a receive carrier frequency compatible with a receive channel selected from the one or more channels, and using a receive duplexing operating mode compatible with a receive millimeter wave of the plurality of millimeter wave bands that correspond to the receive channel. The transceiver has a duplexer configured to route the output transmit signal from the transmitter based on the transmit duplexing operating mode and the transmit millimeter wave band, and the input receive signal to the receiver (Continued)

based on the receive duplexing operating mode and the receive millimeter wave band.

26 Claims, 10 Drawing Sheets

(51) Int. Cl.
| | | |
|---|---|---|
| *H04B 1/04* | (2006.01) | |
| *H04B 1/30* | (2006.01) | |
| *H04B 1/403* | (2015.01) | |
| *H04L 5/14* | (2006.01) | |
| *H04W 24/08* | (2009.01) | |
| *H04W 88/06* | (2009.01) | |

(52) U.S. Cl.
CPC ............... *H04L 5/14* (2013.01); *H04W 24/08* (2013.01); *H04B 2001/307* (2013.01); *H04W 88/06* (2013.01)

(56) References Cited

U.S. PATENT DOCUMENTS

| | | | |
|---|---|---|---|
| 7,376,093 B2 | 5/2008 | Barabash et al. | |
| 7,852,812 B2* | 12/2010 | Li | H04B 1/707 370/335 |
| 8,089,906 B2 | 1/2012 | Poulin et al. | |
| 8,164,425 B2* | 4/2012 | Tanaka | G06K 7/0008 340/10.2 |
| 8,838,049 B1 | 9/2014 | Väisänen et al. | |
| 9,531,450 B2* | 12/2016 | Maltsev | H04B 7/0695 |
| 2002/0128043 A1 | 9/2002 | Chandler | |
| 2005/0157740 A1* | 7/2005 | Sato | H04B 17/345 370/431 |
| 2006/0222054 A1 | 10/2006 | Conyers et al. | |
| 2007/0052524 A1* | 3/2007 | Tanaka | G06K 7/0008 340/10.2 |
| 2008/0136704 A1* | 6/2008 | Chan | G01S 7/282 342/201 |
| 2009/0037628 A1 | 2/2009 | Rofougaran | |
| 2010/0080177 A1 | 4/2010 | Rofougaran | |
| 2010/0118744 A1 | 5/2010 | Kwon et al. | |
| 2010/0330905 A1* | 12/2010 | Aibara | H04B 17/382 455/41.1 |
| 2015/0264699 A1* | 9/2015 | Fwu | H04L 5/0001 370/329 |
| 2016/0149690 A1* | 5/2016 | Khlat | H04W 72/0446 370/280 |
| 2016/0183232 A1* | 6/2016 | Stirling-Gallacher | H04W 72/1226 370/280 |
| 2016/0218406 A1* | 7/2016 | Sanford | H01P 1/208 |
| 2016/0218767 A1* | 7/2016 | Li | H04B 1/401 |
| 2016/0345339 A1* | 11/2016 | Hori | H04W 72/02 |
| 2017/0033854 A1* | 2/2017 | Yoo | H04W 24/00 |

FOREIGN PATENT DOCUMENTS

| | | |
|---|---|---|
| EP | 1376852 A1 | 1/2004 |
| EP | 2073394 A1 | 6/2009 |

* cited by examiner

RECONFIGURABLE MULTI-MODE AND MULTI-BANDS RADIO ARCHITECTURE AND TRANSCEIVER

FIELD

The improvements generally relate to the field of wireless communication technology, and in particular, to transceivers in a wireless network.

INTRODUCTION

Wireless communication systems are used to provide voice and data services for mobile devices and access terminals such as cellular telephones, smartphones, portable computers, various multimedia devices, physical objects embedded with electronics (e.g. sensors, processors, data storage, connectivity interfaces), and so on. Wireless communication systems may involve different types of wireless networks and may use one or more access techniques. Wireless communication systems may integrate with one or more wired or cable communication systems. An example wireless network is a mobile broadband (MBB) network, which may conform to different standards or partnerships such as, for example, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3 GPP), Evolution-Data Optimized EV-DO, or Long Term Evolution (LTE).

LTE is a wireless communication standard for high-speed data communication on mobile devices. LTE and broadband intensive applications of wireless communication increase mobile data traffic on wireless communication systems. This increase in mobile data traffic may pose an issue in urban centers where subscriber mobile devices and mobile data traffic may be concentrated. Operating companies may want to avoid interference in wireless communication systems while maximizing data throughput and availability of wireless communication.

A mobile device sends and receives voice and data signals wirelessly using a transceiver, which is a device having both a receiver and a transmitter. A backhaul communication system involves the use of transceivers as part of base stations or cells, for example. Voice and data signals correspond to electromagnetic signals or waves at different frequencies and wavelengths. The electromagnetic spectrum is a range of possible frequencies of electromagnetic signals. The electromagnetic spectrum is broadly divided into different frequency bands, where each frequency band roughly corresponds to a spectral region of frequencies and wavelengths of electromagnetic signals. For example, the V band of the electromagnetic spectrum range is defined as frequencies from 40 to 75 GHz. An unlicensed portion of the V band may be 57 to 66 GHz, for example. As another example, the E bands of the electromagnetic spectrum may be defined as frequencies from 71 to 76 GHz and 81 to 86 GHz. The V band and E bands may be used for millimeter wave communications systems and may be referred to as millimeter wave frequency bands. Note that a range illustrates a general spectral region and there are no precise boundaries between different frequency bands. Instead, the boundaries fade or blend into other frequency bands.

Wireless communication systems may achieve two-way communication over one or more communication channels using duplexing methods. Example duplexing methods include time-division duplexing (TDD) and frequency-division duplexing (FDD). For FDD, the transmitter and receiver operate at different carrier frequencies. TDD is the application of time-division multiplexing to separate transmit and receive signals. Generally, a wireless communication system may implement FDD using two separate bands or channels. Generally, a wireless communication system may implement TDD using a single band or channel for both transmit and receive signals. The band or channel may be shared by assigning alternating time slots to transmit and receive operations.

SUMMARY

In accordance with one aspect, there is provided a transceiver with a spectrum sensing unit configured to detect, within a plurality of millimeter wave bands, one or more channels with tolerably low interference for selection. The transceiver has a transmitter configured to modulate a transmit signal to an output transmit signal using a transmit carrier frequency compatible with a transmit channel selected from the one or more channels, and using a transmit duplexing operating mode compatible with a transmit millimeter wave of the plurality of millimeter wave bands that correspond to the transmit channel. The transceiver has a receiver configured to demodulate a receive signal from an input receive signal using a receive carrier frequency compatible with a receive channel selected from the one or more channels, and using a receive duplexing operating mode compatible with a receive millimeter wave band of the plurality of millimeter wave bands that correspond to the receive channel. The transceiver has a duplexer configured to route the output transmit signal from the transmitter based on the transmit duplexing operating mode and the transmit millimeter wave band, and the input receive signal to the receiver based on the receive duplexing operating mode and the receive millimeter wave band.

In some embodiments, the spectrum sensing unit may be configured to monitor the channels of each of the plurality of millimeter wave bands to detect interference or blockers to trigger the selection and adjustment of the transmit carrier frequency and the receive carrier frequency based on the interference or the blockers.

In some embodiments, the plurality of millimeter wave frequency bands includes V band and E bands, the duplexing operating mode for V band being time division duplexing and the duplexing operating mode for E bands being frequency division duplexing.

In some embodiments, the receiver comprises a multiport homodyne receiver.

In some embodiments, the multiport homodyne receiver is a six-port homodyne receiver.

In some embodiments, the transmit carrier frequency corresponds to a working channel of the one or more channels, the spectrum sensing unit being configured to detect interference in the working channel, and, upon detecting interference in the working channel, trigger selection of another channel of the one or more channels, and wherein the other channel corresponds to another transmit carrier frequency for the transmit signal.

In some embodiments, the receive carrier frequency corresponds to a working channel of the one or more channels, the spectrum sensing unit being configured to, upon detecting interference in the working channel, trigger selection of another channel of the one or more channels, and the other channel corresponding to another receive carrier frequency for the receive signal.

In some embodiments, the spectrum sensing unit has another receiver and another local oscillator to scan the one or more channels to detect the one or more channels based on a threshold detection value that corresponds to a tolerable level of interference.

In some embodiments, the transceiver has a local oscillator configured to provide a frequency source for the transmitter for the output transmit signal based on the transmit carrier frequency and for the receiver for the input receive signal based on the receive carrier frequency, the local oscillator having a plurality of switches, a microwave frequency source for generating an initial signal, a reconfigurable multiplier to operate in different modes based on the frequency band to convert the initial signal to a multiplied signal, a power divider to divide the multiplied signal, the power divider connecting to the receiver and a switch of the plurality of switches that connects to two additional switches of the plurality of switches, one switch of the two additional switches connecting to another switch of plurality of switches that connects to the transmitter and the other switch of the two additional switches connecting to an up converter with a fixed frequency source that connects to a further switch of the plurality of switches that connects to the transmitter, the local oscillator reconfiguring different signal paths using the plurality of switches based on the receive carrier frequency, the transmit carrier frequency, the transmit duplexing operating mode, and the receive duplexing operating mode.

In some embodiments, the duplexer has an inter-digital quadruplexer and a single pole three throw switch to reconfigure different signal paths for the transmit signal and the receive signal.

In some embodiments, the duplexer has a set of switches and filters, wherein the duplexer reconfigures a plurality of different signal paths using the set of switches and filters for the output transmit signal and the input receive signal, the duplexer separating the transmit signal and the receive signal and provides frequency band filtering.

In some embodiments, the duplexer has a circulator and two tunable filters.

In some embodiments, the duplexer has a triplexer, a band-pass filter and three two-state switches to reconfigure the different signal paths for the transmit signal and the receive signal.

In some embodiments, the duplexer has a triplexer and a diplexer with a shared channel to reconfigure the different signal paths for the transmit signal and the receive signal.

In some embodiments, the transmitter has another set of switches to reconfigure different signal paths for the transmit signal, at least one switch of the other set of switches connecting to an up converter with a fixed frequency source.

In some embodiments, the transmitter has a mixer, wherein the receiver comprises a multiport mixer, and wherein the local oscillator is shared by the mixer of the transmitter and the multiport mixer of the receiver.

In some embodiments, the multiport mixer is a six-port mixer.

In some embodiments, the receiver has a multiport mixer comprising a plurality of output ports, wherein the spectrum sensing unit uses an output port of the plurality of output ports to monitor the channels of each of the plurality of frequency bands to detect the one or more channels.

In some embodiments, the plurality of millimeter wave frequency bands includes at least three frequency bands.

In another aspect, there is provided a wireless device having a transceiver. The transceiver has a spectrum sensing unit configured to detect, within a plurality of millimeter wave bands, one or more channels with tolerably low interference for selection. The transceiver has a transmitter configured to modulate a transmit signal to an output transmit signal using a transmit carrier frequency compatible with a transmit channel selected from the one or more channels, and using a transmit duplexing operating mode compatible with a transmit millimeter wave of the plurality of millimeter wave bands that correspond to the transmit channel. The transceiver has a receiver configured to demodulate a receive signal from an input receive signal using a receive carrier frequency compatible with a receive channel selected from the one or more channels, and using the receive duplexing operating mode compatible with a receive millimeter wave band of the plurality of millimeter wave bands that correspond to the receive channel. The transceiver has a duplexer configured to route the output transmit signal from the transmitter based on the transmit duplexing operating mode and the transmit millimeter wave band, and the input receive signal to the receiver based on the receive duplexing operating mode and the receive millimeter wave band. The wireless device has an antenna connected to the transceiver for transmitting the output transmit signal and receiving the input receive signal. The wireless device has a processor and a memory for sending data to the transceiver to generate the input transmit signal and receiving and storing data from the transceiver from the input receive signal.

In another aspect, there is provided a method for transmitting and receiving signals within a plurality of millimeter wave frequency bands. The method may involve continuously scanning the channels of each of the plurality of frequency bands to detect one or more free channels with tolerably low interference for selection. The method may involve modulating, using a transmitter, a transmit signal to an output transmit signal using a transmit carrier frequency compatible with a transmit channel selected from the one or more channels, and using a transmit duplexing operating mode compatible with a transmit millimeter wave of the plurality of millimeter wave bands that correspond to the transmit channel. The method may involve demodulating, using a receiver, a receive signal from an input receive signal using a receive carrier frequency compatible with a receive channel selected from the one or more channels, and using a receive duplexing operating mode compatible with a receive millimeter wave band of the plurality of millimeter wave bands that correspond to the receive channel. The method may involve routing, using a duplexer, the transmit signal to the transmitter and the receive signal to the receiver based on the transmit millimeter wave band and the transmit duplexing operating mode, and the input receive signal to the receiver based on the receive millimeter wave band and the receive duplexing operating mode.

In some embodiments, the plurality of millimeter wave frequency bands include V band and E bands, the duplexing operating mode for V band being time division duplexing and the duplexing operating mode for E bands being frequency division duplexing.

In some embodiments, the transmit carrier frequency corresponds to a working channel of the one or more channels of the transmit frequency band, wherein the step of continuously scanning comprises upon detecting interference in the working channel, triggering selection and adjustment of another channel of the one or more channels, the other channel corresponding to another transmit carrier frequency for the transmit signal.

In some embodiments, the receive carrier frequency corresponds to a working channel of the one or more channels, wherein the step of continuously scanning comprises upon detecting interference in the working channel, triggering selection and adjustment of another channel of the one or more free channels, the other channel corresponding to another receive carrier frequency for the receive signal.

In some embodiments, the method involves providing a frequency source, using a local oscillator, for the transmitter for the transmit signal based on the transmit carrier frequency and the transmit duplexing operating mode and for the receiver for the receive signal based on the receive carrier frequency and the receive duplexing operating mode.

In another aspect, there is provided a backhaul communication system for wireless devices having a plurality of base stations in wireless communication, each base station comprising at least one antenna and at least one transceiver for the wireless communication. The at least one transceiver having: a spectrum sensing unit configured to detect, within a plurality of millimeter wave bands, one or more channels with tolerably low interference for selection; a transmitter configured to modulate a transmit signal to an output transmit signal using a transmit carrier frequency compatible with a transmit channel selected from the one or more channels, and using a transmit duplexing operating mode compatible with a transmit millimeter wave of the plurality of millimeter wave bands that correspond to the transmit channel; a receiver configured to demodulate a receive signal from an input receive signal using a receive carrier frequency compatible with a receive channel selected from the one or more channels, and using a receive duplexing operating mode compatible with a receive millimeter wave band of the plurality of millimeter wave bands that correspond to the receive channel; and a duplexer configured to route the output transmit signal from the transmitter based on the transmit duplexing operating mode and the transmit millimeter wave band, and the input receive signal to the receiver based on the receive duplexing operating mode and the receive millimeter wave band.

Many further features and combinations thereof concerning embodiments described herein will appear to those skilled in the art following a reading of the instant disclosure.

DESCRIPTION OF THE FIGURES

In the figures.

DETAILED DESCRIPTION

Figure 1:
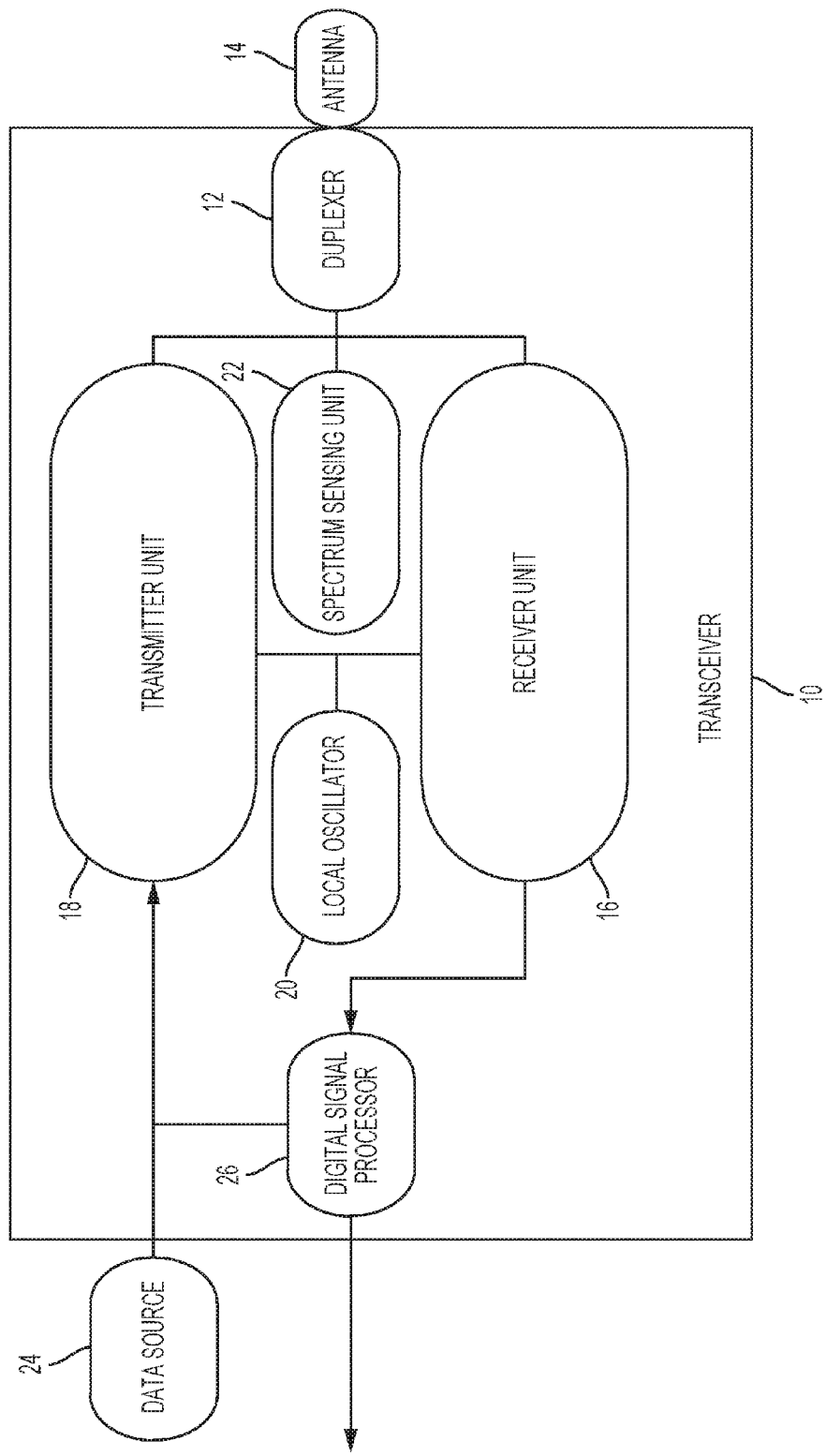
FIG. 1 is a view of an example transceiver according to some embodiments.

Embodiments described herein may provide a reconfigurable multi-mode and multi-band transceiver with a multi-port demodulator. As an illustrative example embodiment, the transceiver may have a six-port demodulator. Multi-mode may refer to use of a plurality of different duplexing operating modes for wireless communication, such as both TDD and FDD operating modes, for example. Multi-band may refer to use of a plurality of frequency bands for wireless communication, such as three frequency bands including V band (57-66 GHz) and E bands (71-76 GHz, 81-86 GHz). These are illustrative example embodiments and the multi-band operating mode may involve other frequency bands using different frequency planning. For some illustrative example embodiments, multi-mode may be referred to as dual-mode and multi-band may be referred to as dual-bands or tri-bands.

The increase of mobile data traffic on wireless communication systems may particularly pose an issue in urban centers where subscriber mobile devices and mobile data traffic are concentrated. Millimeter wave frequency bands may feature large bandwidth, provide high data capability, and use pencil beaming signal processing techniques to enhance frequency reuse and provide interference protection. Accordingly, embodiments of transceivers described herein may use millimeter wave bands for wireless communication, such as for example V-band (57-66 GHz) and E-bands (71-76 GHz, 81-86 GHz).

Traditional microwave frequency bands may be depleted in view of fast-growing MBB network demand. Example embodiments described herein may use V-band (57-66 GHz) and E-bands (71-76 GHz, 81-86 GHz) to implement small-cell backhaul system solutions since these bands may be sparsely occupied. A frequency band may be divided into multiple channels or segments of frequencies. For example, for E bands there may be approximately 10 GHz of available spectrum segmented into channels. Channel space may vary (e.g. 125, MHz, 250 MHz, and 500 MHz) and may be bundled depending on the application.

Operating companies may want to achieve maximum data throughput and availability for mobile wireless communication systems while avoiding interference. Embodiments described herein may provide a combined V/E-band or multi-bands radio architecture in a flexible transceiver product. According to regulations and standards (e.g. European Electronic Communication Committee and US Federal Communication Commission), V-band has unstructured channelization which may use TDD operating mode, whereas E-band may be structured around FDD operating mode. Thus, embodiments described herein may provide a multi-band and multi-mode radio architecture that may be reconfigurable for multiple duplexing modes and multiple frequency bands using a set of switches and filters to define different signal paths depending on the duplexing mode and frequency band.

Wireless communication systems operating in V band or E bands may have functional differences or incompatibilities which may make integration in a single transceiver difficult. For example, E-bands have structured channels while V-band may not have structured channels. Embodiments described herein may provide a transceiver or radio architecture system that operates using a TDD duplexing operating mode in V-band and an FDD duplexing operating mode in E-bands. Accordingly, the duplexing operating mode may be based on the frequency band.

V-band includes industrial, scientific and medical (ISM) bands in Europe and may be open for license-free use. In order to mitigate interference, embodiments described herein may provide a transceiver or radio architecture system with a hardware unit able to sense the spectrum of multiple frequency bands and recognize free available in-band channels (e.g. with no interference or a tolerably low level of interference) while at the same time using at least one channel for data communication (e.g. transmit or receive communication). In some example embodiments, the transceiver may sense spectrum interference and communicate simultaneously.

Embodiments described herein may provide a transceiver that may realize this multi-functionality in an integrated scheme with a unified transceiver architecture for multiple bands and multiple operating modes. Embodiments described herein may provide a transceiver that may be an efficient, low cost and low size product.

FIG. 1 shows an illustrative example transceiver 10 according to embodiments described herein. Transceiver 10 may be reconfigurable to operate in multi-mode and multi-bands. For example, embodiments described herein may provide a transceiver 10 or radio architecture system that operates in V band (57 GHz-66 GHz) and E bands (71 GHz-76 GHz, 81 GHz-86 GHz) or three frequency bands as an illustrative example. Accordingly, the multi-bands may refer to three frequency bands or more than three frequency bands in other embodiments. In accordance with embodiments described herein, a transceiver 10 may have radio frequency (RF) components employed in the RF front-end to support wireless communication in multiple frequency bands or be reconfigurable to support a range of frequency from multiple bands.

The transceiver 10 is shown with integrated parts or components. For example, the transceiver 10 may have a duplexer 12 with one or more switches to route signal related data to various components of the transceiver 10 by way of different signal paths defined by the one or more switches. The duplexer 12 may be reconfigurable to reconfigure different signal paths depending on the current operating band (e.g. E bands, V band), the current duplexing operating mode (e.g. TDD, FDD), and so on. The duplexer 12 facilitates navigation of signals in three frequency bands for this example embodiment. In other example embodiments, the duplexer 12 may facilitate navigation of signals in more than three frequency bands.

According to embodiments described herein, the duplexer 12 may navigate signals in multiple frequency bands for increased flexibility. The duplexer 12 may have filters, diplexers and switches. The duplexer 12 provides a signal routing function with both switches and filters to define different signal paths. The duplexer 12 is reconfigurable to route the transmit signal from a transmitter 18 to an antenna 14, and the receive signal to a receiver 16 from the antenna 14 using signal paths defined by a set of switches. The reconfigurable duplexer 12 reconfigures different signal paths using the switches for the transmit signal based on the transmit frequency band and the transmit duplexing operating mode and for the receive signal based on the receive frequency band and the receive duplexing operating mode. The duplexer 12 facilitates use of both the TDD duplexing operating mode and FDD duplexing operating mode, for example.

A common port of the duplexer 12 connects to an antenna 14 and two other ports connect to a transmitter 18 and a receiver 16, respectively. A spectrum sensing unit 22 may also connect to a port of the duplexer 12. A port may be shared between the receiver 16 and duplexer 12 using a divider or coupler, for example. The duplexer 12 may use the same antenna 14 for both transmit and receive signal communications. The duplexer 12 may avoid self-made interference from transmitter 18 to receiver 16 as unwanted leakage may cause blocking. As described herein, the duplexer 12 may be implemented using a duplexing unit, filter bank, set of switches, and so on.

The transceiver 10 has a receiver 16 (or receiver unit) with a demodulator to demodulate receive signals from input receive signals that are received from the duplexer 12 depending on a current receive carrier frequency. The receiver 16 is configured to process the receive signal using a duplexing operating mode based on the receive frequency band. The receiver 16 provides the demodulated signal to a digital signal processor 26 for further processing. The receiver 16 may include a wide band six port demodulator. The wide band demodulator accommodates multiple frequency bands (e.g. V band, E bands). The transceiver 10 may have multiport receiver technology, such as for example six-ports. Multiport receiver technology may provide a low cost implementation and may be used at high frequencies to realize a direct conversion receiver by way of a homodyne receiver, for example. This may be achieved by the combination of analog frontend active mixers and diodes with subsequent digital signal processing. The diodes of the multiport network may function as mixers. The multiport network and the diode circuitry may be viewed as a mixer. Multiport (e.g. six-port) receiver technology may provide low power consumption for an efficient architecture. In example embodiments, the receiver 16 may be a homodyne receiver with direct conversion.

The transceiver 10 has a transmitter 18 (or transmitter unit) with a modulator to modulate the base band data received as input data from data source 24 to a transmit carrier frequency depending on the current transmit frequency band in order to generate an output transmit signal. The transmitter 18 provides the modulated transmit signal to the duplexer 12 for subsequent transmission by antenna 14. The transmitter 18 may be configured to process the transmit signal using a duplexing operating mode based on the current transmit frequency band. The transmitter 18 may be of hybrid homodyne and heterodyne technology depending on the operating mode. For example, the transmitter 18 may operate with direct up conversion based on homodyne technology for V-band mode and may be based on heterodyne technology for E-band. The transmit carrier frequency may be different than the receive carrier frequency and the current transmit frequency band may be different than the current receive frequency band.

The transceiver 10 may have a local oscillator (or LO) 20 to provide the local oscillator signal or frequency source for the modulator and demodulator in the transmitter 18 and the receiver 16, respectively. The local oscillator 20 is operable to generate a signal at different frequencies depending on the mode of operation. For TDD operating mode, the local oscillator 20 generates signals at frequencies in V-band. For FDD operating mode, the local oscillator 20 generates signals at frequencies in E-band. The local oscillator 20 may have two output ports, one connected to the receiver 16 and the other connected to the transmitter 18. The local oscillator 20 may be reconfigurable to provide a frequency source for both the transmit signal for the transmitter 18 based on the current transmit frequency band and the duplexing operating mode, and the receive signal for the receiver 16 based on the receive frequency band and the duplexing operating mode. The duplexing operating mode may be different for the receive and transmit signals. The transmitter 18 and the receiver 16 share the frequency source of the local oscillator 20 and the local oscillator 20 generates signals at different frequency levels depending on the operating mode and current band. The local oscillator 20 may be reconfigurable to provide different signal paths for an initial signal or frequency source depending on the current operating band, the current operating mode, and so on.

The transceiver 10 has a spectrum sensing unit 22 to monitor the channels of the current frequency band to provide awareness to the transceiver 10 of free channels or channels with tolerably low interference for selection. The spectrum sensing unit 22 may monitor the channels to detect blockers or interference in adjacent channels. That is, the spectrum sensing unit 22 is configured to monitor the channels of the current operating band and each of the other frequency bands to detect one or more channels with tolerably low interference to trigger selection and adjustment of the transmit carrier frequency and the receive carrier frequency based on the one or more channels detected. The spectrum sensing unit 22 may also implement interference awareness in some example embodiments. The spectrum sensing unit 22 continuously samples receive signal data to monitor all of the channels in the current frequency band. The spectrum sensing unit 22 may detect interference in the working channel using the sampled receive signal data and notify of another free channel or of a band with little or no or a tolerably low level of interference.

The spectrum sensing unit 22 is an example illustration of components of the transceiver 10 that may be used to detect interference, but other components of the transceiver 10 may also be used to detect interference according to other embodiments. For example, according to some embodiments, in-channel interference (e.g. interference which is in the same channel as the current channel in use for communication) detection may also be implemented, for example, by other software and/or hardware of the receiver 16 configured to monitor the quality of communication. Accordingly, in-channel interference detection by comparing the received signal power with the expected signal power is an example function of the spectrum sensing unit 22 according to some embodiments, but other components of the transceiver 10 may also provide this functionality in other embodiments. That is, other components of the transceiver 10 may implement in-channel interference detection in other embodiments.

The spectrum sensing unit 22 may distinguish between interference and the desired signal of communication if the strength of interference in the channel (from sampled signal data) is considerably more than the expected power of the signal of interest, for example. The spectrum sensing unit 22 monitors other channels in the same frequency band to provide awareness of free channels to the transceiver 10. If interference is detected, the transceiver 10 may switch to other spare channels within the current operating band or to the other frequency band. For example, if the transceiver is currently operating in one of the E-bands the spectrum sensing unit 22 monitors all of the channels in the E-bands. If interference is detected the spectrum sensing unit 22 can notify of the interference and/or trigger a tuning adjustment (e.g. via the local oscillator 20) to tune to another available channel determined to have no or little or tolerable interference. The interference level may be measured using one or more threshold detection values corresponding to one or more tolerable interference levels, for example, using a threshold detection technique. If all channels of the E-bands are in use or have detected interference, then the spectrum sensing unit 22 may trigger a switch to V-band and an available or free channel with no or tolerably low interference within the V-band. The spectrum sensing unit 22 scans or sweeps the channels and frequency bands to detect interference to trigger selection and adjustment of the transmit carrier frequency and the receive carrier frequency. The spectrum sensing unit 22 continuously monitors the channels and bands while the transceiver 10 communicates. That is, the spectrum sensing unit 22 may provide interference mitigation simultaneous with communication.

The transceiver 10 may be reconfigurable to multiple duplexing operating modes (e.g. TDD/FDD) and multiple frequency bands (e.g. E bands and V band) realized by reconfigurable duplexing, reconfigurable local oscillation sources, and different base band signal generating and processing techniques using switches, filters and circuits.

The transceiver 10 shown in FIG. 1 is an illustrative example. As shown, the transceiver 10 has a spectrum sensing unit 22 configured to detect, within a plurality of millimeter wave bands, one or more channels with tolerably low interference for selection. The transceiver 10 has a transmitter 18 configured to modulate a transmit signal to an output transmit signal using a transmit carrier frequency compatible with a transmit channel selected from the one or more channels, and using a duplexing operating mode compatible with a transmit millimeter wave band of the plurality of millimeter wave bands that corresponds to the transmit channel. The transceiver 10 has a receiver 16 configured to demodulate a receive signal from an input receive signal using a receive carrier frequency compatible with a receive channel selected from the one or more channels. The transceiver 10 has a duplexer 12 configured to route said output transmit signal from said transmitter and said input receive signal to the receiver based upon the duplexing operating mode and the transmit millimeter wave band.

Figure 2:
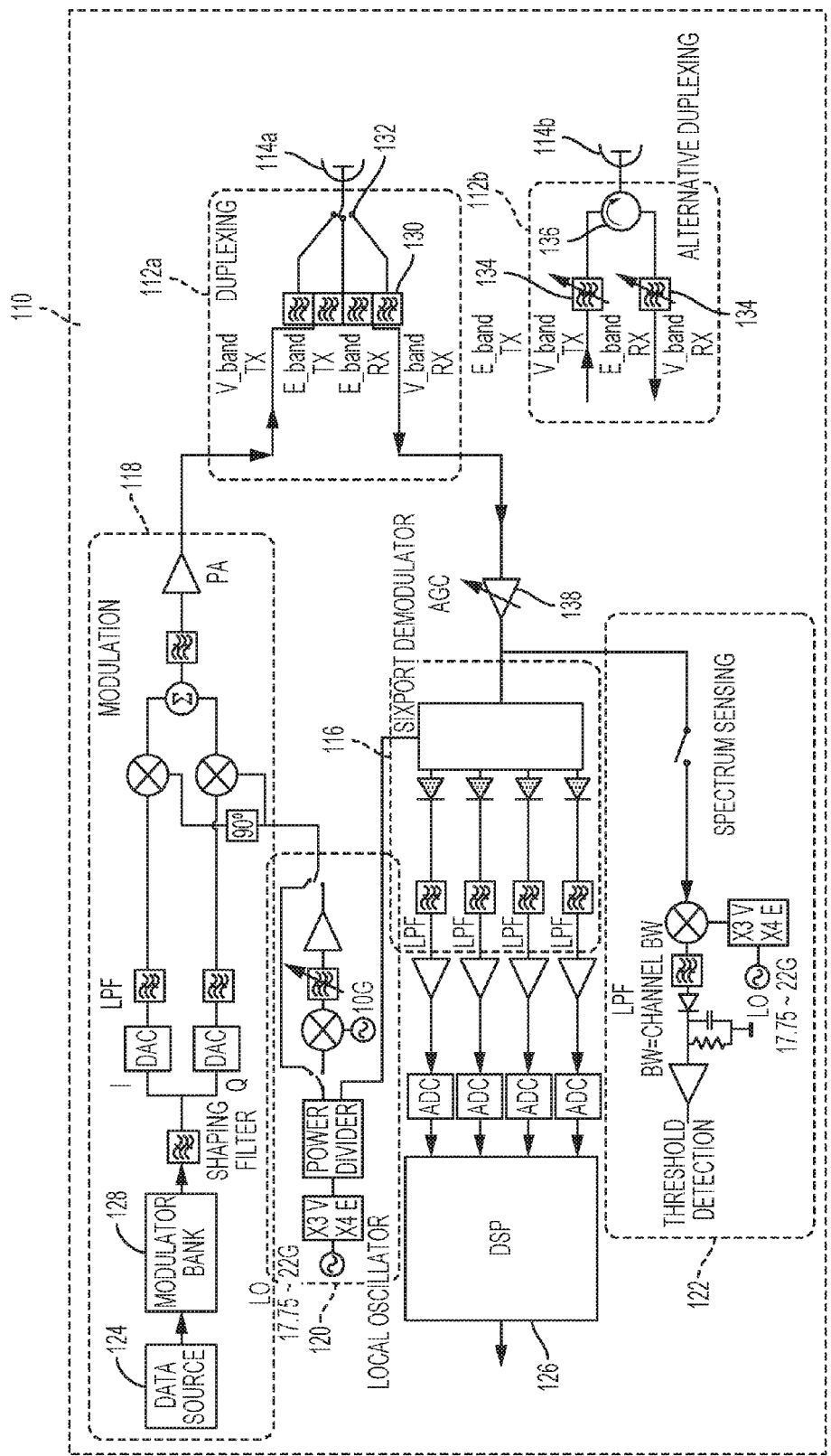
FIG. 2 is a view of another example transceiver according to some embodiments.

FIG. 2 shows another illustrative example transceiver 110 according to embodiments described herein.

As an illustrative example, the transceiver 110 has a duplexer 112a (or duplexing unit) to separate and route the transmit and receive signals, respectively, which enables sharing of the same antenna 114a for transmit and receive operations. In this example, the duplexer 112a has an inter-digital quadruplexer 130 connected with a single pole three throw (SP3T) switch 132 to define different signal paths for signal data (e.g. receive signals, transmit signals). The duplexer 112a separates and routes the transmit and receive signals for antenna 114a and provides frequency band filtering for the multiple frequency bands. A common port of the duplexer 112a connects to the antenna 114a and the other two ports connect to a transmitter 118 and receiver 116 respectively. FIG. 2 shows an alternative example duplexer 112b with a circulator 136 that connects to two tunable filters 134 to define signal paths for the transmit and receive signals. The alternative duplexer 112b similarly uses the same antenna 114b for transmit and receive operations.

The transceiver 110 has a receiver 116 implemented using a wide band sixport homodyne receiver and demodulator to demodulate signals (e.g. at receive carrier frequency) received from the duplexer 12. This is an illustrative example implementation and other embodiments may use a multiport receiver with greater or less than six ports. The receiver 116 provides the demodulated signal to a digital signal processor (DSP) unit 126 for further processing. The receiver 116 may be implemented using a multiport (e.g. six port) demodulator and functions as a homodyne receiver. The multiport or six-port demodulator unit along with the diode circuitry mixes the received signal with LO 120 or another local oscillator. Four mixing products may be processed in order to derive demodulated signals in baseband. The receiver 116 detects the four power input into the power detectors and demodulates the received M-ary modulated signal by processing the four power levels in the DSP unit 126. The transceiver 110 has an auto gain or level controller (AGC/ALC) 138 before the input of the six-port homodyne receiver to fix the input power at a working point in the square law region. The receiver 116 may include low pass filters (LPF) to filter the demodulated signals. The filtered signals may be processed by analog to digital converters (ADC) for provision to the DSP unit 126.

The transceiver 110 has a transmitter 118 (or transmitter unit) implemented using a wide band homodyne transmitter and modulator to modulate base band data to the millimeter wave carrier frequency (e.g. transmit carrier frequency) depending on the operating mode and frequency band. The transmitter 18 receives input data from a data source 124 for provision to a modulator bank 128 for filtering. The transmitter 118 modulator may apply an M-ary modulation technique, for example.

The transceiver 110 has a local oscillator 120 to provide the local oscillator signal or frequency source for the modulator in the transmitter 118 and the demodulator in the receiver 116. That is, both the transmitter 118 and receiver 116 may use the same local oscillator 120 for the local oscillator signal or frequency source.

The local oscillator 120 may be implemented using a microwave frequency source with a certain bandwidth (e.g. 17.75 to 22 GHz), a reconfigurable multiplier, a power divider, switches, and an up converter containing a fixed frequency source. The bandwidth of the frequency source may be 17.75 to 22 GHz, for example. This is an example range of operation for this illustrative embodiment of the local oscillator 120 and transceiver 110. The transceiver 110 (and in particular local oscillator 120) provides source multipliers of X3 for V-band (e.g. 57~66 GHz) and ×4 for E-bands (e.g. 71~76 GHz and 81~86 GHz). For example, 57~66 GHZ divided by three equals 19~22 GHz and, as another example, 71~76 GHz divided by four equals 17.75~19 GHz. These are example parameters for this illustrative example embodiment and other ranges and parameters may apply to other embodiments. For FDD duplexing operating mode, the fixed frequency source may be 10 GHz which may correspond to the frequency difference between uplink and downlink frequencies in E bands given that available channel range for 81~86 GHz and 71~76 GHz is approximately 10 GHz. In this example embodiment, the frequency of the microwave frequency source (referred to as f_1) is 17.75~22 GHz.

Figure 3:
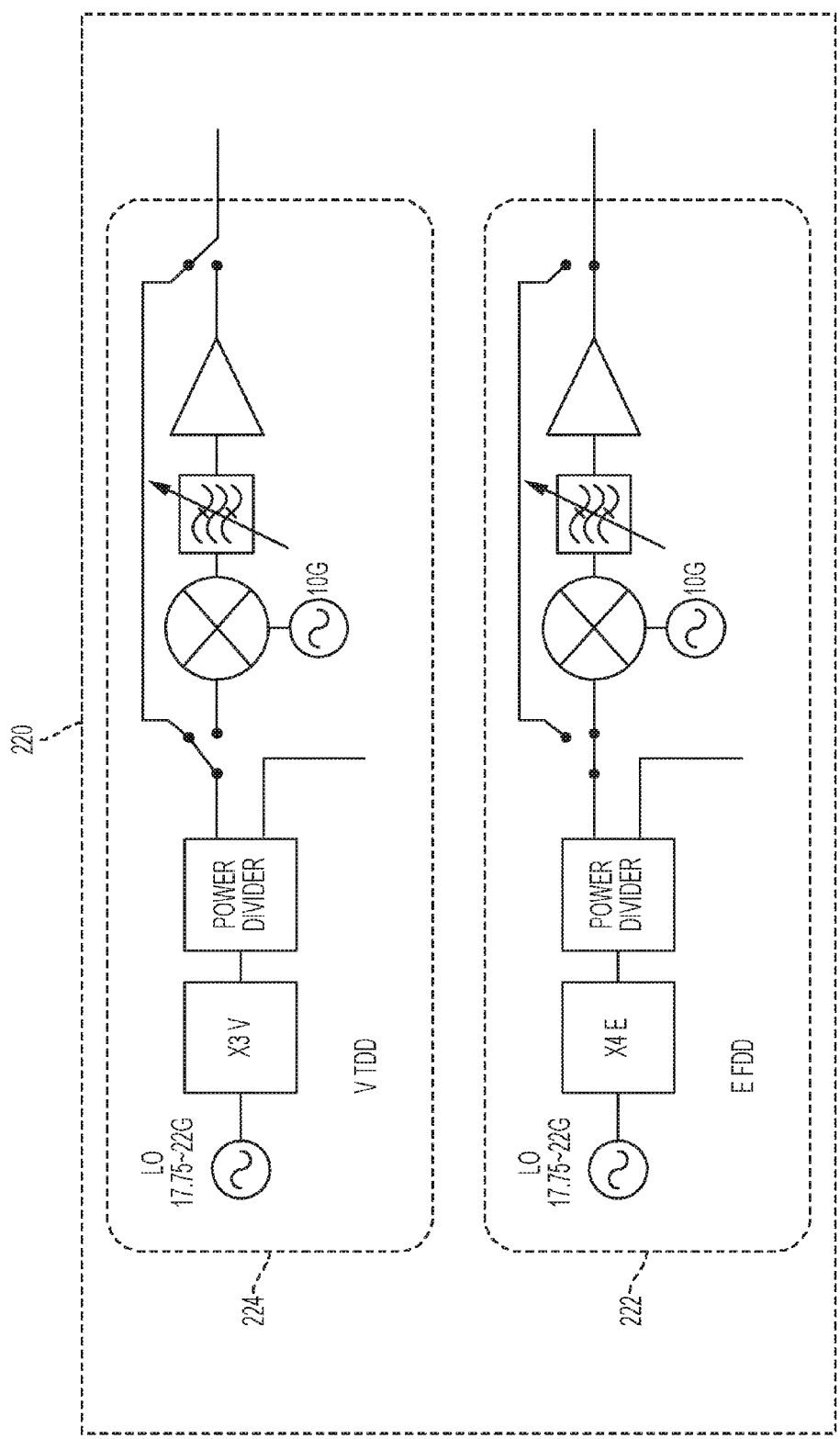
FIG. 3 is a view of an example local oscillator according to some embodiments.

FIG. 3 shows an illustrative example local oscillator 220 configured for a V band and TDD operating mode configuration and an E bands and FDD operating mode configuration. When operating in V band, the multiplier is set to ×3 mode and when operating in either of the E bands, the multiplier is operating in ×4 mode to convert frequency of the signal from f_1 to f_2 respectively. The purpose of the reconfigurable multiplier is to reduce the bandwidth of the microwave frequency source and enables use of the same frequency source for different frequency bands and operating modes. This may reduce the design complexity and cost of the microwave frequency source and local oscillator 220. The multiplied signal f_2 is divided into two parts by a power divider where one part signal S1 feeds into the six-port demodulator of the receiver 116 and the other part signal S2 feeds into a switch for provision to transmitter 118. The part of the signal S1 feeds directly to the demodulator in this example as there are no switches in the signal path to the receiver 116 for this embodiment. The local oscillator 220 is reconfigurable for different signal paths using a set of switches. The part of the signal S2 passes through two switches of a set of switches (e.g. three switches in this example embodiment), where the switches are in different modes depending on the current operating mode. The signal S2 may go through different signal paths (as directed by the switches) depending on the operating mode (TDD and FDD). When working in V band TDD mode, since the receive signal and transmit signals have the same frequency, S2 may directly pass to the modulator of the transmitter 118 through a first and second switch. When working in E band FDD mode, since the receiving signal and transmitting signals have a frequency difference of 10 GHz, S2 may pass through the first switch and another switch to define a signal path connection to a fixed frequency source. In this operating mode, the signal S2 is mixed with a fixed frequency reference of 10 GHz. After mixing, the following tunable filter may choose an upper side band signal f_2+10 GHz or a lower side band signal f_2−10 GHz according to the frequency assignment of the transceiver system. As an illustrative example, the transmit signal may be in the frequency range of 81 GHz to 86 GHz and the receive signal may be in the frequency range 71 GHz to 76 GHz. The multiplied signal f_2 may be 71 GHz to 76 GHz and the tunable filter may choose an upper side band signal f_2+10 GHz.

As another illustrative example, the transmit signal may be 71 GHz to 76 GHz and the receiving signal may be 81 GHz to 86 GHz. The multiplied signal f_2 may be 81 GHz to 86 GHz and the following tunable filter may choose lower side band signal f_2−10 GHz. Note that the required power of two local oscillator 220 parts may be different. The power of the part feeding to the six-port demodulator of the receiver 116 may be much less than the part feeding to the modulator of the transmitter 118.

Referring back to FIG. 2, the transceiver 110 has a spectrum sensing unit 122 to monitor the channels and bands to detect channels with tolerably low interference. For example, the spectrum sensing unit 122 continuously monitors the channels in the current frequency band(s) to detect one or more channels with tolerably low interference. If interference appears in the working channel, the spectrum sensing unit 122 triggers a tuning adjustment (via local oscillator 120) to other spare or channels with tolerably low interference or to another frequency band and a channel with tolerably low interference of the other frequency band.

The spectrum sensing unit 122 may trigger reconfiguration of the transceiver 110 between multi-modes (e.g. TDD and FDD modes) and multi-bands (e.g. V band and E bands) realized by reconfigurable duplexers to provide different signal paths, reconfigurable local oscillation sources, different signal paths, different base band signal generating and processing using circuits and switches, for example. The wide band modulator and demodulator may be shared for both duplexing operating modes and frequency bands.

The spectrum sensing unit 122 may use a separate homodyne receiver. The spectrum sensing unit 122 may have a mixer, a local oscillator, a low pass filter, and a power detector. The mixer down converts the received millimeter wave signal to zero-IF. The local oscillator may be a microwave frequency source with frequency range of 17.75-22 GHz, as an illustrative example, and a reconfigurable ×3/×4 multiplier for V/E bands. The low pass filter sets the resolution bandwidth. While in operation, the local oscillator sweeps the whole working band at a step of the resolution bandwidth to detect one or more channels with tolerably low interference. The output voltage level of the power detector corresponds to the total power of the signals in the resolution bandwidth at the current sweeping frequency. Thus, after one sweep of the working band, the spectrum sensing unit 122 obtains the spectrum distribution in the band for use as a reference for choosing the working channel and band for detection of channels with tolerably low interference and interference mitigation, for example. If the spectrum sensing unit 122 detects interference then the spectrum sensing unit 122 may notify and/or trigger a tuning adjustment to a channel with low or no detected interference or another band with a channel with tolerably low interference.

The transceiver 110 may attempt to maximize sharing of transceiver hardware components to reduce the amount of individual hardware components and parts required. The transceiver 110 may use filter banks, switches, tunable filters, and wideband frequency reference sources, as example hardware components. The reconfigurable transceiver 110 provides a combination of multi-bands and multi-modes in millimeter wave frequency bands as an illustrative example.

Known approaches may focus on duplexing only which may not be adapted to a TDD operating mode as there may be no band selection filter. Also, known approaches with multiple stages of switches may result in high insertion loss. Other known approaches may not separate TDD operating mode in V band and FDD operating mode in E bands.

The transceiver 110 provides a reconfigurable multi-mode and multi-bands radio architecture with multiport demodulator. The reconfigurable transceiver 110 may be implemented using a homodyne transceiver structure with a low cost six-port receiver, for example. The reconfigurable transceiver 110 may be implemented using a low cost duplexing technique. A reconfigurable local oscillator or reference source (e.g. microwave frequency source) may provide the same frequency source or signal for V band and TDD operating mode and two signals with 10 GHz frequency difference for E bands and FDD operating mode.

The transceiver 110 has an auxiliary spectrum sensing unit 122 that monitors the whole working band to detect free channels and for interference mitigation purpose. The spectrum sensing unit 122 provides notification when interference is detected in a current or working channel. The spectrum sensing unit 122 also keeps the system aware of unused in-band free channels.

An example alternative embodiment may use a mixer based demodulator instead of six-port demodulator, for example. A further example alternative embodiment may use a five-port demodulator or other multiport demodulator instead of six-port demodulator. Another example alternative embodiment may use a circulator plus two tunable/switchable filters as the duplexer 112b, for example. A further example alternative embodiment may use a heterodyne receiver in the spectrum sensing unit 122.

The example transceiver 110 may provide a low cost homodyne architecture and a low cost multiport demodulator that is robust to interference.

Figure 4:
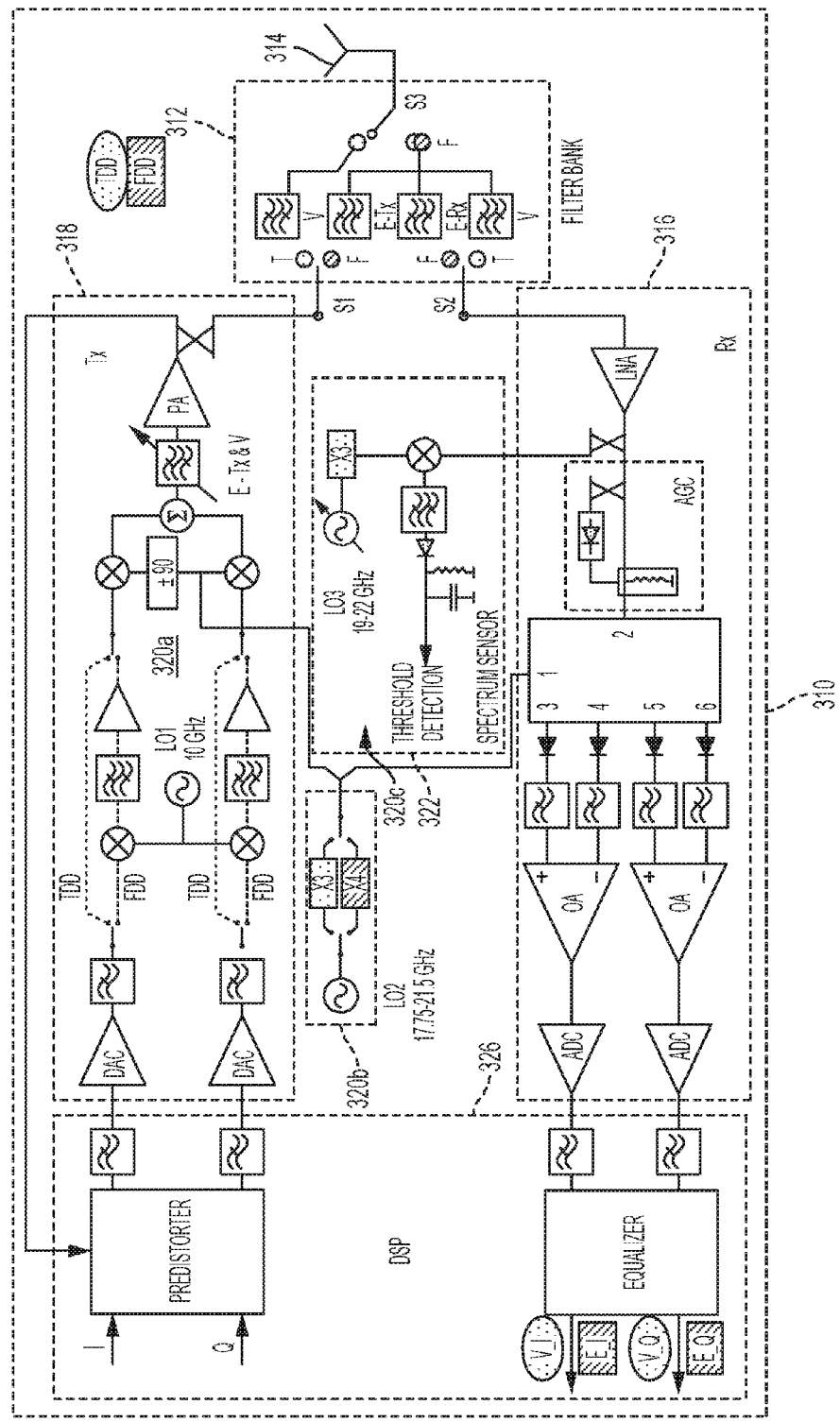
FIG. 4 is a view of another example transceiver according to some embodiments.

FIG. 4 illustrates another example embodiment of a transceiver 310 that may utilize three bands (e.g. V band and E bands) and operate in two modes (e.g. FDD and TDD) for data communication. The example transceiver 310 has a DSP unit 326, a transmitter 318 (e.g. Tx block), a receiver 316 (e.g. Rx block), a duplexer 312 and a single antenna 314. The transceiver 310 may also include a spectrum sensor or spectrum sensing unit 322 to sample signals from the frequency spectrum in order to monitor the whole band to detect channels with tolerably low interference for interference mitigation.

The transmitter 318 may be implemented using a hybrid heterodyne-homodyne topology so that it can use only one variable frequency local oscillator 320a for up-conversion to radio frequency (RF) at multiple frequency bands (e.g. V band and E bands) in two modes (e.g. FDD and TDD).

The duplexer 312 (which may also be referred to as a filter bank or filter-diplexer bank) may be used for transmitting and receiving signals at different frequency bands in different duplexing operating modes. For clarification, in V-band one single band may be shared. The duplexer 312 allows sharing of a single antenna 314 and/or single frequency band. The duplexer 312 may use a triplexer for separating signals at different frequency bands (e.g. E bands, V band). The duplexer 312 may be used to implement functionality described in relation to duplexer 12 (FIG. 1), for example, by routing transmit and receive signals to the receiver 316 and from the transmitter 318 using reconfigurable signal paths defined using switches and filters. The duplexer 312 provides unified blocks of each mode of TDD and FDD at different frequency bands, and also allows a single antenna 314 to be shared between both the receiver 316 and the transmitter 318. The carrier frequency of transmitting and receiving signals may be identical (or near identical) in TDD mode, while there may be a fixed difference of the carrier frequency of transmitting and receiving signals in FDD mode. Nevertheless, a local oscillator 320b signal is shared between the receiver 316 and the transmitter 318. The fixed difference of the carrier frequency of transmitting signals and receiving signals in FDD mode may already be considered by the transmitter 318 through heterodyne up conversion by local oscillator 320a.

The transceiver 310 has a spectrum sensing unit 322 that may be implemented either independently or in a combined manner before or after the down-converter block, respectively. The specific arrangement shown in the example transceiver 310 architecture may provide for sharing of components for multi-functions. This may make the transceiver 310 compact, low cost with an efficient design.

The DSP unit 326 forms symbols out of the transmit signal data in accordance with a selected modulation scheme. The DSP unit 326 shapes the symbols using digital filters. The digital in-phase and quadrature components may be converted to analog signals to be sent to the transmitter 318 for up-conversion.

The signal processed by the transmitter 318 may be low-pass filtered first. Depending on the operational mode (e.g. TDD in V-band or FDD in E-bands) the signal may be switched over to two different signal paths for up-conversion, where switches define the different signal paths. If the system operates in V-band with TDD mode the signal may be directly up-converted to the desired channel through quadrature modulation. The LO 320b signal originates from a phase-locked loop (PLL) voltage controlled oscillator (VCO) which is then multiplied by a factor of three.

If the system operates in E-band with FDD mode, both in-phase (I) and quadrature (Q) components of baseband signal may be first converted to intermediate frequency (IF) using an local oscillator 320b oscillating at a constant frequency, which may be a difference between FDD lower and higher bands, i.e. 10 GHz for E-bands. The IF signals may be up-converted using a quadrature mixer. The local oscillator signal may originate from the same VCO but its frequency is multiplied by a factor of four so that the up-converted signal locates at E-band.

Note that the quadrature mixing of IF signals forms a single side-band (SSB) mixer. The signal may be up-converted to E-Low (71 GHz-76 GHz) by suppressing the upper-side band (USB) or to E-High (81 GHz-86 GHz) by suppressing the lower-side band (LSB). The selection of either USB or LSB may depend on which band is selected as of up-link communication.

The radio frequency (RF) signal is then filtered in the tunable band-pass filter (BPF). This BPF may be wideband and also tunable between both bands of V and E for transmit signals. A portion of the filtered signal may be taken via a directional coupler upon being amplified by a power amplifier for the purpose of applying pre-distortion techniques. Then the signal goes through a duplexer 312 before being transmitted by an antenna 314.

The example duplexer 312 has a triplexer, a single BPF with center frequency at the TDD unlicensed band (V-band) and three two-state switches to define different signal paths. The Triplexer may have a BPF with a center frequency at TDD band, and two other BPFs with center frequency at FDD forward and reverse bands (71-76 GHz and 81-86 GHz). In TDD mode of operation, switches S1 and S2 are in state T and the switch S3 alternates between two states within the TDD time slots. Thereby, the transmitting and received signals go through the BPFs of the TDD mode. On the other hand and in FDD mode, all three switches S1, S2, and S3 stop in state F so that the transmitting and receiving signals may go through the forward and reverse BPFs, respectively.

In the receiver 316, this signal is first amplified using a low noise amplifier (LNA) and then enters the six-port mixer. The initial gain at the receiver input is controlled by automatic gain control (AGC) loop which consists of a directional coupler, a log detector and a variable attenuator.

For this example embodiment, a six-port mixer is used for down converting the RF signal by mixing the signal with very low power LO. In other embodiments different multi-port mixer configurations may be used. The LO signal which is used for the transmitter 318 may be shared with the receiver 316 to be used for the six-port mixer which operates as a direct down converter for both V and E bands. In V-band, since both up-link and down-link signals share identical frequency channels the frequency up-conversion in transmitter 318 and down-conversion in receiver 316 can be done with the same LO through direct conversion or homodyne manner. However, in E-band there is a difference between the carrier frequency of up-link and down-link signals (i.e. 10 GHz). Therefore, up-conversion may be done through two times mixing or heterodyne scheme which allows sharing the millimeter wave LO between RF mixer in transmitter 318 and sixport mixer in receiver 316. The diodes in sixport mixer operate in square-law region, the required LO power is very low. This may be an advantage in comparison to the conventional mixers, because generating high power LO may be expensive.

The signals at the output of the six-port mixer may be low-pass filtered and differentiated using operational amplifiers in order to form I and Q signals.

The transceiver 310 may be able to handle different duplexing operating modes (e.g. TDD and FDD). Furthermore, the RF front-end may have two distinct blocks. One block may be a transceiver with a diplexer at the terminal of the antenna that may transmit signals at the first band (F1) and receive signals at the second band (F2). This may let the transceiver operate in FDD mode completely but only function as a transmitter in TDD mode which is assumed to be the mode for the first band only. The other block may have a separate receiver antenna, which functions as a receiver that can receive signals in both bands of F1 in TDD mode and F2 in FDD mode. The additional signal may be received through the second receiver block in FDD mode that may improve the system performance through maximal ratio combining when space diversity technique is employed. An example application scenario may be wireless mobile data communication cells with a spatial diversity technique to help mitigate the effect of fading.

The use of additional receiver blocks in known systems may unnecessarily increase the complexity and the cost of the whole system. Other known systems may unnecessarily open the receiver input to interference from other bands or may let the spurious products of the transmitter be transmitted out.

Embodiments described herein may provide advantages by modifying two separate signal paths in either the transmitter 318 or receiver 316, and may be allocated to each band with replacement by a single path in both the transmitter 318 and receiver 316 using tunable filters at the antenna terminal and reconfigurable frequency divider in the LO synthesizer. This may make the system more compact and low cost. Known approaches may not operate in both modes of TDD and FDD.

Known systems may be only capable of operating in FDD or TDD modes using only two frequency bands which may not be as functional when the system has to use different frequency bands in TDD mode.

As described, illustrative example embodiments may provide a transceiver 310 that functions in two modes of TDD and FDD within three different bands, or more, for example. In some embodiments, this may be implemented through a duplexer 312, frequency plan and the configuration of transmitters 318 and receivers 316. The transceiver 310 may be able to monitor all in-band channels by sensing the whole spectrum of the band being used for communication by the transceiver to detect interference.

Transmitter 318 may have a hybrid heterodyne and homodyne topology to minimize the number of required tunable LO while the direct conversion in the receiver 316 enables the same LO to be shared between transmitter 318 and receiver 316. This may make the architecture simple, compact and low cost.

The receiver 316 may use a multiport (e.g. sixport) mixer to operate with very low LO powers. This may help reduce the power consumption especially for the systems operating at millimeter wave frequencies.

Figure 5:
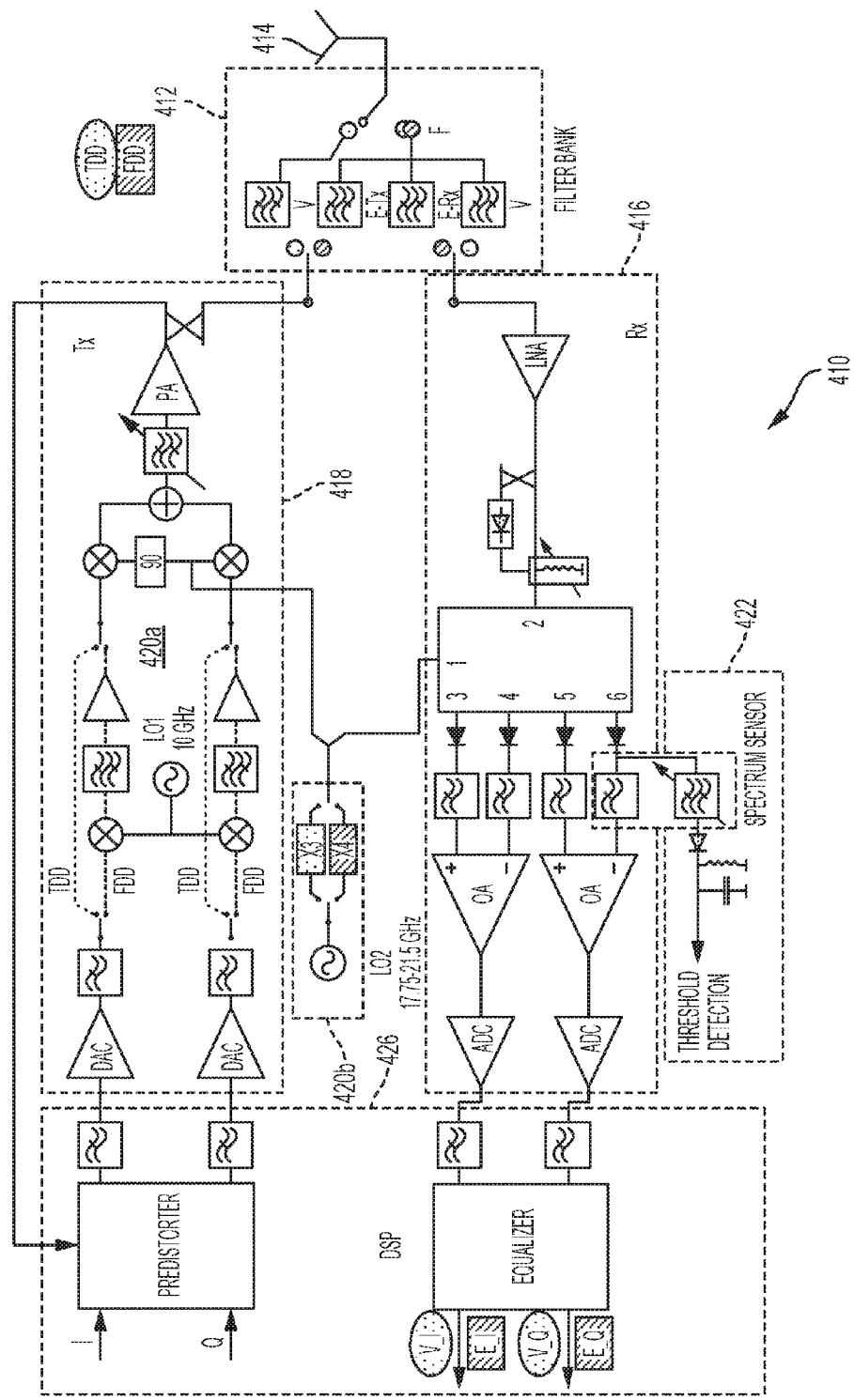
FIG. 5 is a view of another example transceiver according to some embodiments.

FIG. 5 shows another example transceiver 410 according to some embodiments. The example transceiver 410 has a DSP unit 426, a transmitter 418 (e.g. Tx block), a receiver 416 (e.g. Rx block), a duplexer 412 and a single antenna 414. The transceiver 410 may also include a spectrum sensor or spectrum sensing unit 422 to sample signals from the frequency spectrum in order to monitor the whole band for free channels and interference. The transceiver 410 includes an LO unit 420b for both transmitter 418 and receiver 416. The transmitter 418 may include an additional LO 420a. The duplexer 412 may include a filter bank.

In another example embodiment, the function of spectrum sensing unit 422 may be implemented using one of the output ports of the sixport mixer. Furthermore, the block may be simplified by removing the mixer and the LO3 and replacing the fixed BPF with a tunable one. The tunable BPF may form a diplexer with LPF and separate the signals (probably interference) in adjacent channels from the main baseband signal. Interference level in channels may be monitored by the spectrum sensing unit 422 while not impacting the main communication signal.

Figure 6:
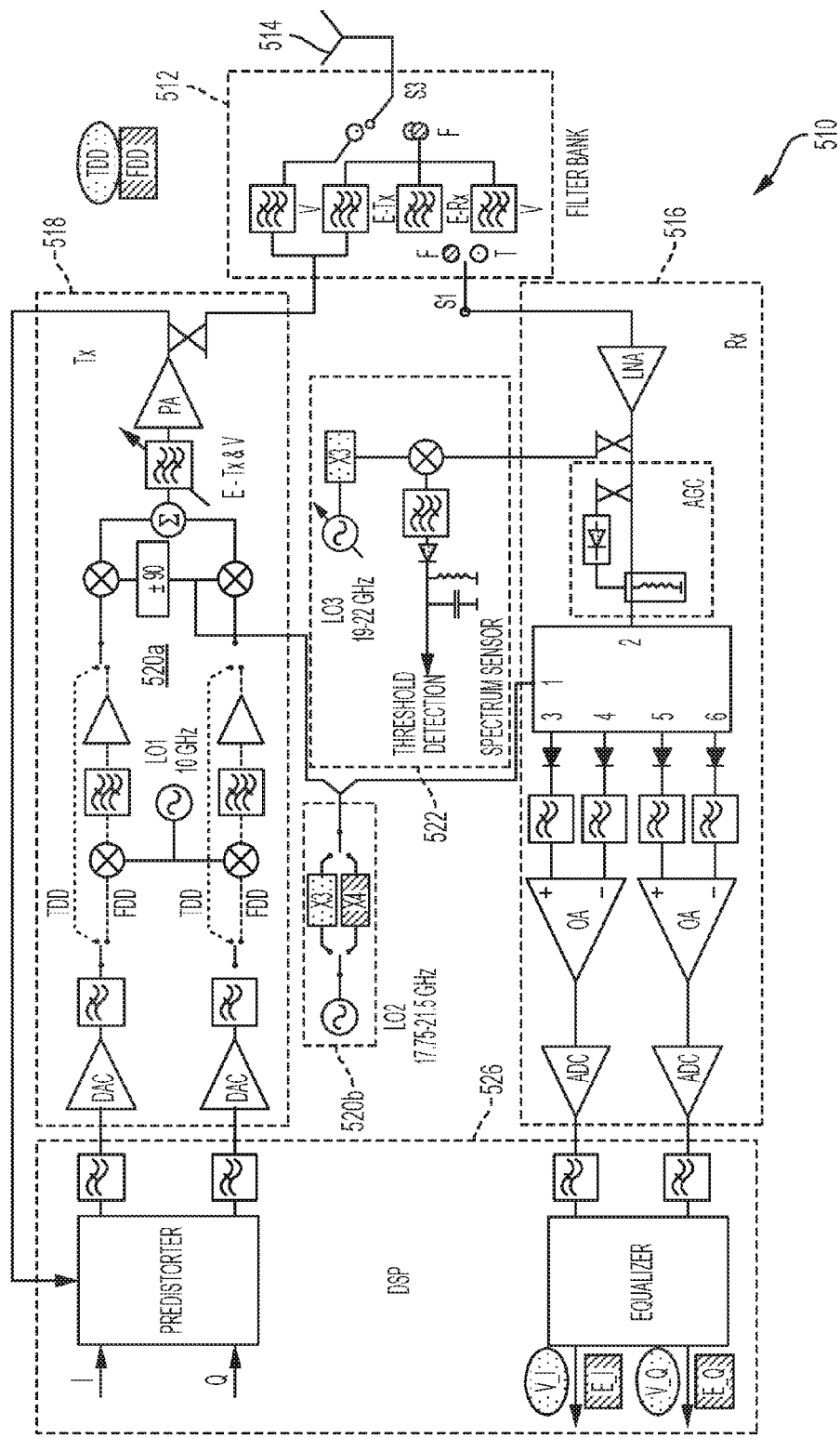
FIG. 6 is a view of a further example transceiver according to some embodiments.

FIG. 6 shows another example transceiver 510 according to embodiments. The example transceiver 510 has a DSP unit 526, a transmitter 518 (e.g. Tx block), a receiver 516 (e.g. Rx block), a duplexer 512 and a single antenna 514.

The transceiver 510 may also include a spectrum sensor or spectrum sensing unit 522 to sample signals from the frequency spectrum in order to monitor the whole band for free channels and interference. The transceiver 510 includes an LO 520b for both the transmitter 518 and receiver 516. The transmitter 518 may include an additional LO 520a in this example embodiment. A difference between the transceiver 510 of FIG. 6 and the transceiver 310 of FIG. 4 is the configuration of filter bank for duplexer 512 (FIG. 6) and duplexer 312 (FIG. 4). Another example difference is that one less switch may be used. This configuration of the duplexer using the filter bank may be used with different transceivers in either FIG. 4 or FIG. 5 or FIG. 7. That is, the filter bank may be used with other embodiments of the transceiver.

In another embodiment, the duplexer 512 may be a combination of a triplexer and a diplexer with one shared channel and a switch S3. The duplexer 512 may provide example functionality for duplexer 12 (FIG. 1). The transmitting signal may be directed to TDD or FDD nodes. The example switch has three states which may be selected according to the operational mode. In FDD mode the switch routes the incoming signal to the common port of the E-band filters, and hence the up-link and down-link signals are separated by going through different BPFs, shown as E-Tx and E-Rx. In TDD mode, the main signal path to and from the antenna 514 is switched between two V-band filters in the timing order of TDD as the transmitter 518 and receiver 516 are operating in different time slots in this mode.

Within the receiver 516, the signal at the four output ports of sixport-mixer may be sampled individually and be differentiated in the digital domain. This may allow more freedom to apply various calibration techniques for compensating the DC offset, and IQ gain or phase imbalance. Also, the receiver 516 may employ the predistorter, AGC or the equalizer. Finally, the proposed architecture may be contextualized for a V-E band system but is not limited to it. The proposed architecture is generally capable of implementation in applications that employ a combination of two modes at other frequencies. For example, the up-link frequency range may be 890 to 915 MHz (Uplink-UL) and downlink frequency range may be 935 to 960 MHz (Downlink-DL) for frequency bands in GSM900 system.

The flexible transceiver 510 may be capable of operating in two different modes within three different bands (V band, E bands). In other embodiments, there may be additional or different frequency bands to provide flexibility for various applications. This may be achieved through signal management at the antenna terminal, using duplexer 12 (FIG. 1) or other example duplexers. This may also achieve unification of the functional blocks of different types of transceivers such as antenna, LOs and the frequency converters. Embodiments described herein may provide a transceiver 510 that may be robust, compact and low cost.

Spectrum sensing unit 522 adds a layer to data communication making the transceiver a spectrum aware architecture. This allows the transceiver 510 to switch to any free channel should any severe or intolerable interference disturb the system performance. If all in band channels are already occupied, the system can switch the mode and make use of the other band. Thereby, the system makes use of the resources efficiently.

The proposed transceiver architecture enables LOs to be shared between transmitter 518 and receiver 516 in both modes. In addition, the multiport (e.g. sixport) mixers in the receiver 516 require very low power LOs, and hence the transceiver 510 may operate with low power consumption.

Figure 7:
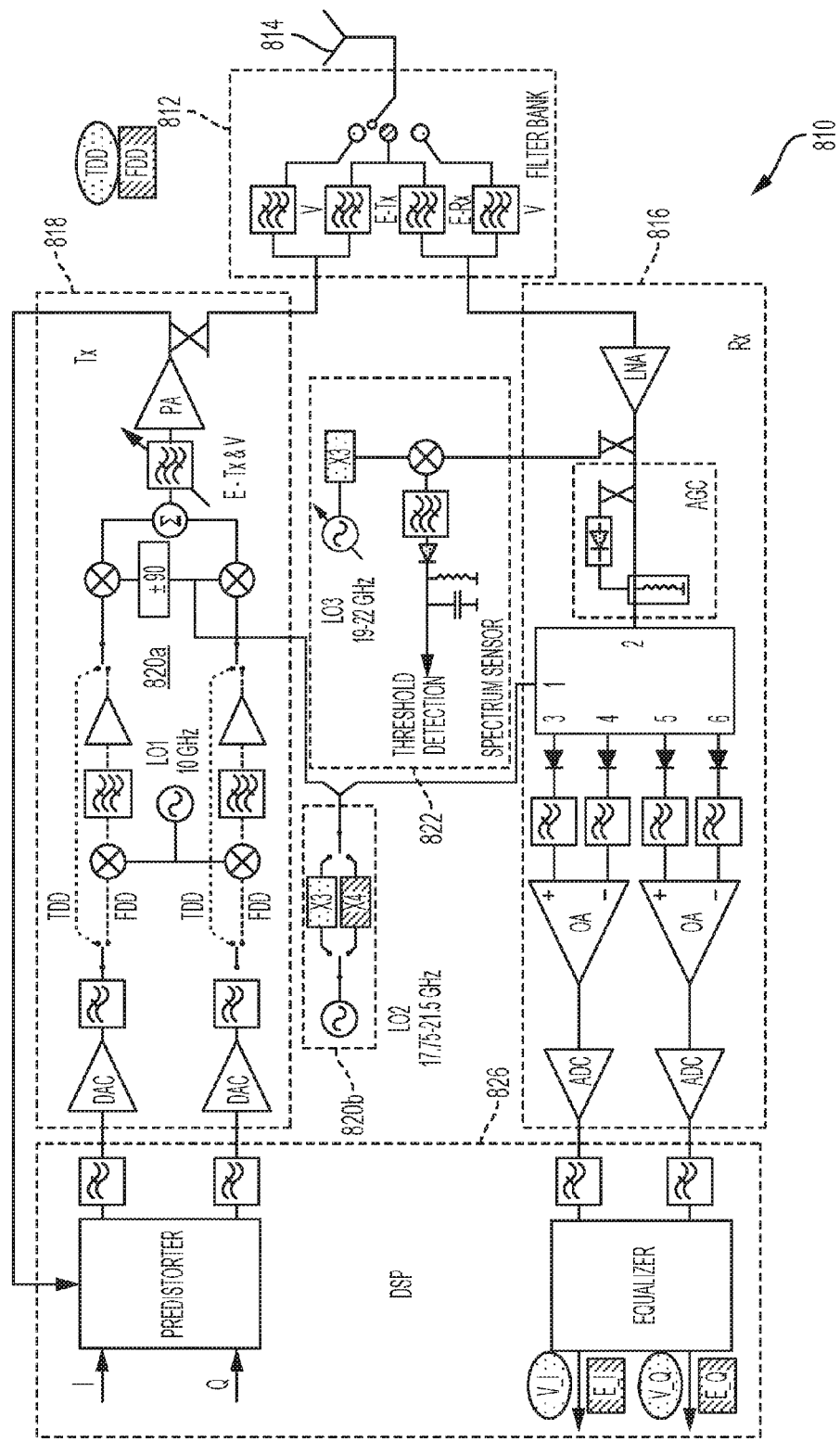
FIG. 7 is a view of a further example transceiver according to some embodiments.

FIG. 7 shows another example transceiver 810 according to embodiments. The example transceiver 810 has a DSP unit 826, a transmitter 818 (e.g. Tx block), a receiver 816 (e.g. Rx block), a duplexer 812 and a single antenna 814. The transceiver 810 may also include a spectrum sensor or spectrum sensing unit 822 to sample signals from the frequency spectrum in order to monitor the whole band for free channels and interference mitigation. The transceiver 810 includes an LO unit 820b for both transmitter 818 and receiver 816. The transmitter 818 may include an additional LO 820a for the transmitter 818. The duplexer 812 is similar to duplexer 112a of FIG. 2 shown in a different style of illustration.

Figure 8:
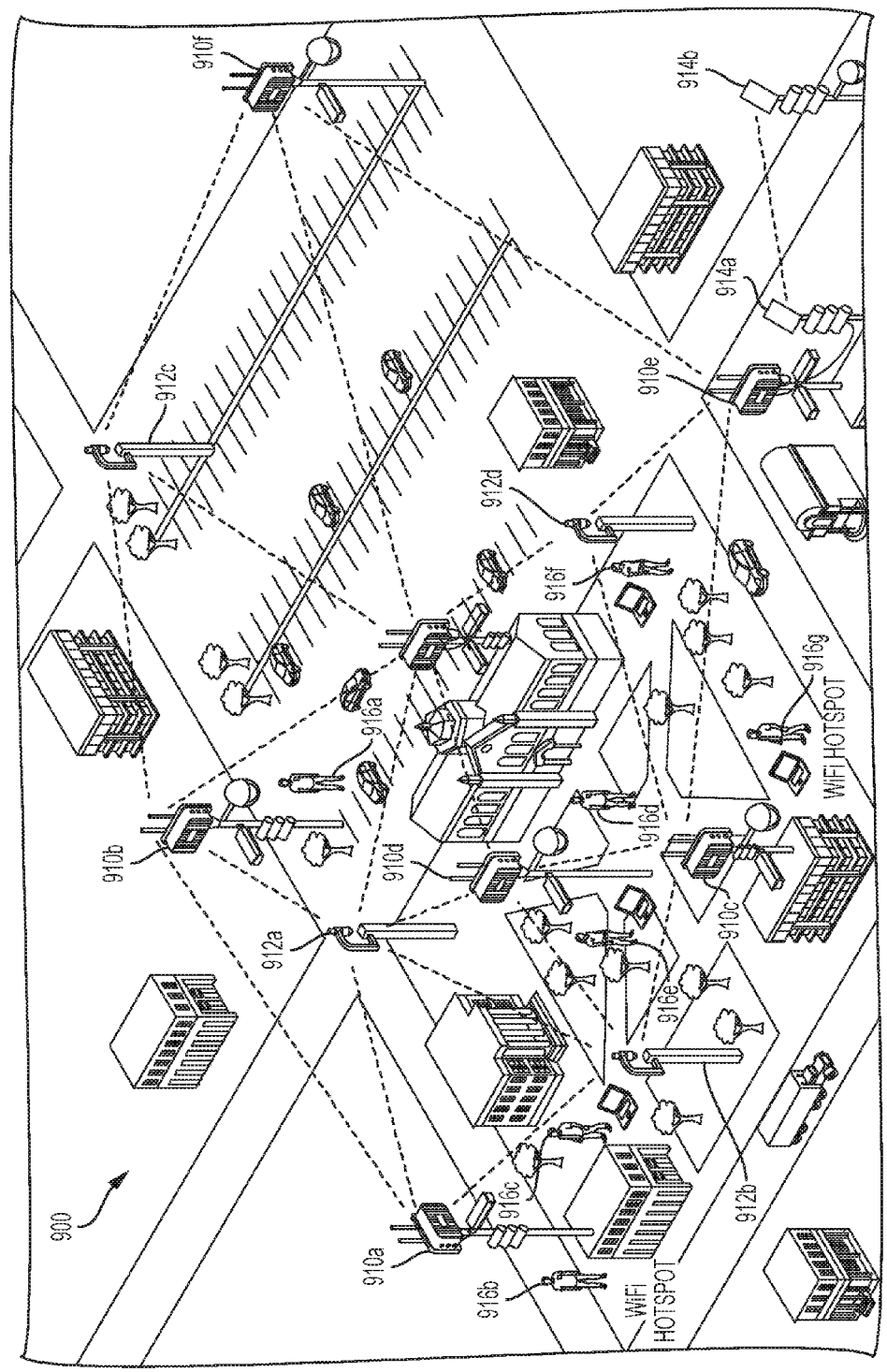
FIG. 8 is a view of an example backhaul communication system.

Embodiments described herein may use millimeter wave frequency bands, such as for example V-band (57-66 GHz) and E-bands (71-76 GHz, 81-86 GHz), for dense LTE site backhaul applications, for example. FIG. 8 illustrates an example system 800 for backhaul applications. For a wireless communication system, the backhaul portion of a network may include intermediate links between the core or backbone network and the sub-networks at the edge of the entire wireless network.

Backhaul technology in small cells may address the considerable demand of mobile wireless communication with high data throughput. Given the unavailability of fiber connections and industry need for rapid and low-cost deployment, the millimeter wave radio technology is an option for backhaul small cell applications. V-band and E-band are spectral regions for implementing small-cell backhaul solutions because of their available large bandwidths as well being sparsely occupied.

The example system 800 provides a wireless network using different backhaul solution components. For example, the system 800 includes wireless base stations 910a, 910b, 910c, 910d, 910e, 910f with transceivers implemented according to embodiments described herein and network controllers to dynamically configure the wireless network. A base station may serve as the hub of a wireless network and may also be the gateway between a wired network and the wireless network. The base stations 910a, 910b, 910c, 910d, 910e, 910f may include a router and an network interface connecting to a network controller, for example. The base stations may also be referred to as cell sites. The cell sites may be small cells, micro cells, and macro cells, for example. The base stations 910a, 910b, 910c, 910d, 910e, 910f are in wireless communication with other base stations 910a, 910b, 910c, 910d, 910e, 910f different wireless devices 916a, 916b, 916c, 916d, 916e, 916f, 916g that may also include transceivers implemented according to embodiments described herein. The system 800 may also include other types of example base stations 914a and 914b, 912a, 912b, 912c, 912d, which may be in wireless communication with each other and with the other base stations 910a, 910b, 910c, 910d, 910e, 910f using the transceiver technology described herein. The different types of base stations 914a, 914b, 912a, 912b, 912c, 912d may also include transceivers implemented according to embodiments described herein. The system 800 may provide cellular communication services and W-Fi communication services to end user wireless devices 916a, 916b, 916c, 916d, 916e, 916f, 916g using the base stations 910a, 910b, 910c, 910d, 910e, 910f, 914a, 914b, 912a, 912b, 912c, 912d.

Figure 9:
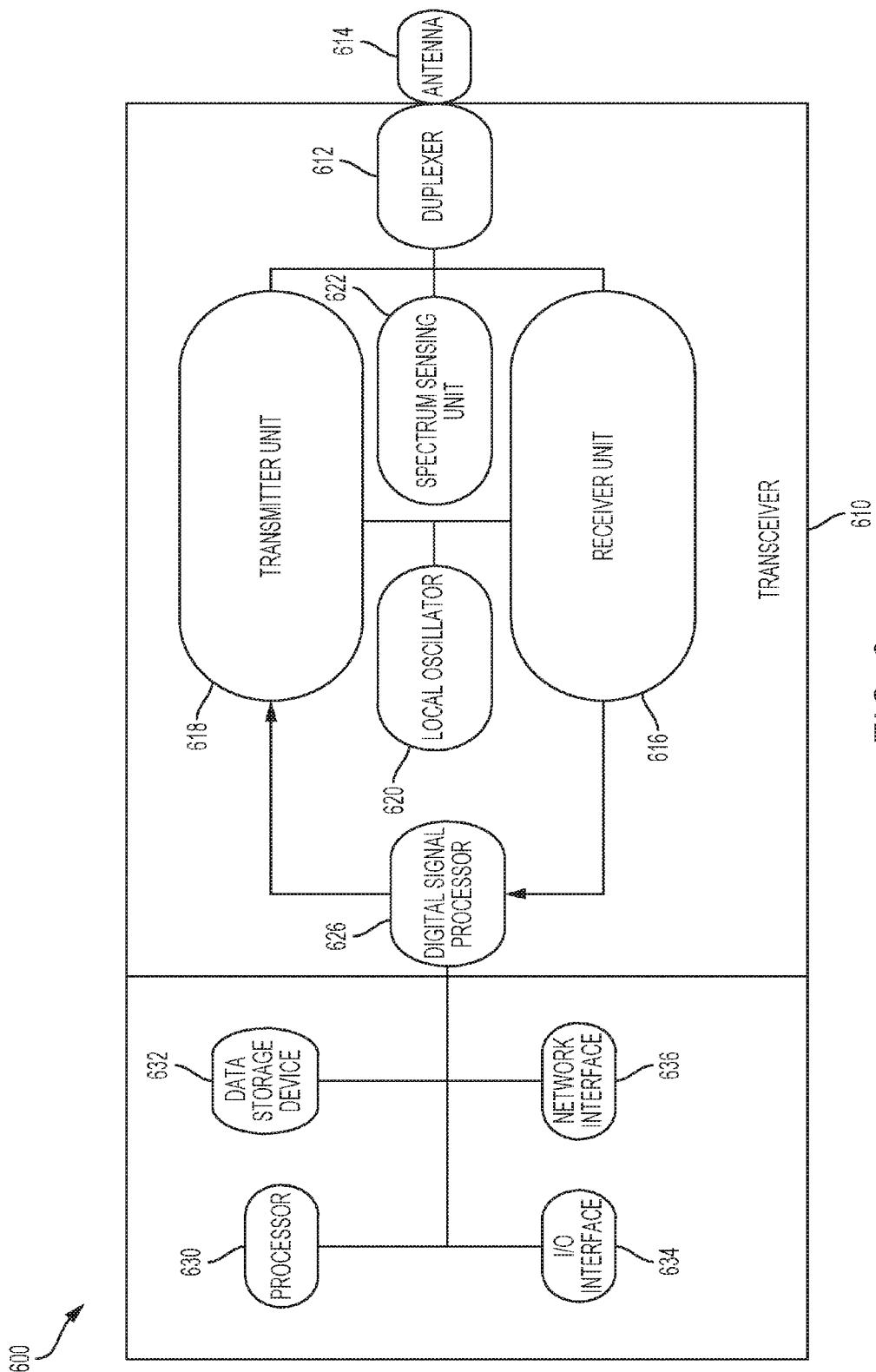
FIG. 9 is a view of an example wireless device according to some embodiments.

FIG. 9 is a view of an example wireless device 600 according to some embodiments. A wireless device 600 may implement or communicate with cell sites or base stations of a wireless network and other wireless devices, for example.

The wireless device 600 may be implemented by physical computer hardware, including computing devices, servers, receivers, transmitters, processors, memory, input/output devices and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

For simplicity only one wireless device 600 is shown but a system may include more wireless device 600 operable by users for voice and data services. A system may include wireless devices 600 of the same or different device type.

The wireless device 600 has a transceiver 610 which may be implemented according to various transceiver architectures described herein. For example, the transceiver 610 may have a wide band transmitter 618 configured to modulate a transmit signal to an output transmit signal using a transmit carrier frequency depending on the current transmit frequency band. The transmitter 618 may be configured to process the transmit signal using a (transmit) duplexing operating mode based on the current transmit frequency band.

The transceiver 610 has a wide band receiver 616 configured to demodulate a receive signal from an input receive signal depending on a current receive carrier frequency. The receiver 616 is configured to process the receive signal using a (receive) duplexing operating mode based on the receive frequency band.

A reconfigurable duplexer 612 is configured to route the transmit signal from the transmitter 618 to the antenna 614, and the receive signal to the receiver 616 from the antenna using switches and/or filters. The reconfigurable duplexer 612 reconfigures different signal paths using the switches and/or filters for the transmit signal based on the transmit frequency band and the (transmit) duplexing operating mode and for the receive signal based on the receive frequency band and the (receive) duplexing operating mode.

The transceiver 610 has a reconfigurable local oscillator 620 configured to provide a frequency source for both the transmit signal for the transmitter based on the receive frequency band and the receive duplexing operating mode, and the receive signal for the receiver based on the receive frequency band and the receive duplexing operating mode. That is, the transmitter 618 and the receiver 616 share the frequency source of the local oscillator 620.

The transceiver 610 has a spectrum sensing unit 622 configured to monitor the channels of each of the plurality of frequency bands and to detect interference to notify and/or trigger selection and adjustment of the transmit carrier frequency and the receive carrier frequency. The spectrum sensing unit 622 continuously monitors for interference mitigation simultaneous to communication.

The wireless device 600 has a single antenna 614 connected to the transceiver for transmitting the transmit signal and receiving the receive signal.

The wireless device 600 has computing components for sending data to the transceiver to generate the transmit signal, and for receiving and storing data from the transceiver from the receive signal. The computing components include at least one processor 630, a data storage device 632 (including volatile memory or non-volatile memory or other data storage elements or a combination thereof), at least one I/O interface 634, and at least one communication or network interface 636. The computing device components may be connected in various ways including directly coupled, indirectly coupled via a network, and distributed over a wide geographic area and connected via a network (which may be referred to as "cloud computing").

Each processor 630 may be, for example, any type of general-purpose microprocessor or microcontroller, a DSP unit, an integrated circuit, a field programmable gate array (FPGA), a reconfigurable processor, a programmable read-only memory (PROM), or any combination thereof.

Data storage device 632 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 634 enables wireless device 600 to interconnect with one or more input devices, such as a keyboard, mouse, camera, touch screen and a microphone, or with one or more output devices such as a display screen and a speaker.

Each network interface 636 enables wireless device 600 to communicate with other components, to exchange data with other components, to access and connect to network resources, to serve applications, and perform other computing applications by connecting to a network (or multiple networks) capable of carrying data including a combination of wireless and wired networks.

Wireless device 600 is operable to register and authenticate users (using a login, unique identifier, and password for example) prior to providing access to applications, a local network, network resources, other networks and network security devices. C Wireless device 600 may serve one user or multiple users. Wireless device 600 is operable to communicate with transceivers of backhaul system (FIG. 9) according to some embodiments.

Figure 10:
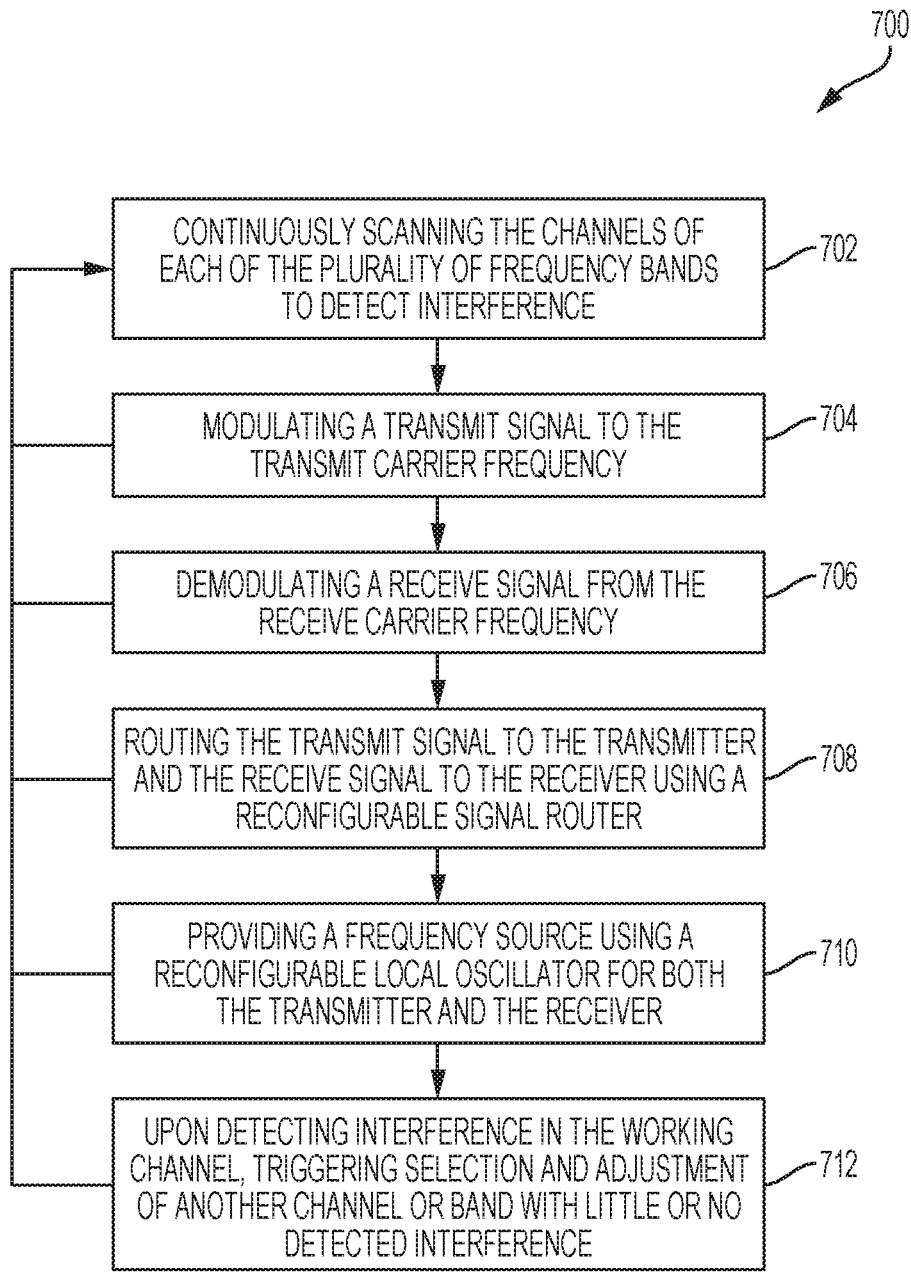
FIG. 10 is a flowchart view of an example process according to some embodiments.

FIG. 10 illustrates a flow chart view of a method 700 for transmitting and receiving signals in multiple millimeter wave frequency bands using various duplexing operating modes. The method 700 will be described with reference to FIG. 1 but other example transceivers (e.g. FIGS. 2, 4, 5, 6, 7) may also be used to implement the method 700.

At 702, a spectrum sensing unit 22 (FIG. 1) continuously scans the channels of each of the frequency bands to detect channels with interference and channels with tolerably low interference. The monitoring enables the spectrum sensing unit 22 to trigger notification, selection and adjustment from the working or current channel of a frequency band to another channel with tolerably low interference or band if interference is detected. The monitoring is continuous and simultaneous to the communication of the transceiver 10 for rapid and efficient adjustment or tuning of the transmit carrier frequency or receive carrier frequency band when interference is detected.

At 704, the transmitter 18 (FIG. 1) modulates a transmit signal to an output transmit signal using the transmit carrier frequency within the current transmit millimeter wave (frequency) band. The transmitter 18 also processes the transmit signal using a (transmit) duplexing operating mode based on the current transmit frequency band. For example, for V band the duplexing operating mode is TDD and for E bands the duplexing operating mode is FDD.

At 706, the receiver 16 (FIG. 1) demodulates a receive signal from an the receive carrier frequency within the current receive frequency band and processes the receive signal using a (receive) duplexing operating mode based on the current receive millimeter wave (frequency) band.

At 708, the duplexer 12 (FIG. 1) routes the transmit signal to the transmitter 18 and the receive signal to the receiver 16 by reconfiguring different signal paths using switches in this example. A signal path may be reconfigured for the transmit signal based on the transmit frequency band and the transmit duplexing operating mode. A signal path may be reconfigured for the receive signal based on the receive frequency band and the receive duplexing operating mode.

At 710, local oscillator 20 may be reconfigurable to provide a frequency source for both the transmitter 18 and the receiver 16. That is, the local oscillator 20 may be reconfigurable to provide a frequency source for the transmit signal for the transmitter based on the transmit frequency band and the transmit duplexing operating mode. The local oscillator 20 may be reconfigurable to provide a frequency source for the receive signal for the receiver based on the receive frequency band and the receive duplexing operating mode.

The method 700 returns to 702 as the spectrum sensing unit 22 (FIG. 1) and continuously scans the channels and bands for interference mitigation while modulating transmit signals and demodulating receive signals for communication purposes.

At 712, upon detecting interference in the working channel, the spectrum sensing unit 22 (FIG. 1) triggers selection and adjustment to another channel or band with tolerably low interference by tuning the carrier frequency from the current working channel to the other channel or band. For transmission, upon detecting interference in the working channel, the spectrum sensing unit 22 triggers notification, selection and adjustment of another channel in the transmit frequency band or another transmit frequency band with little or no detected interference, the other channel corresponding to another transmit carrier frequency for the transmit signal. For receiving, upon detecting interference in the working channel, the spectrum sensing unit 22 triggers notification, selection and adjustment of another channel in the receive frequency band or another receive frequency band with little or no detected interference, the other channel corresponding to another receive carrier frequency for the receive signal.

Accordingly, embodiments described herein may provide a wireless backhaul solution for small cells using transceivers described herein with the combination of multi band operation to fully exploit the spectrum in millimeter wave frequency and maximize the throughput. An example of different frequency bands is V-band and E-bands. Due to the channelization characteristics, V-band is suitable for TDD, whereas E-band is suitable for FDD so the current frequency band used for the transmit signals and the receive signals will impact which duplexing operating mode is used by the transceiver. The transceiver may provide a reconfigurable duplexing scheme for both V-band TDD and E-band FDD duplexing modes. The transceiver may also use a six-port low cost demodulator or mixer with a share local oscillator with the transmitter. The transceiver may have a duplexer or duplexing module, a wide band multiport homodyne receiver, a wide band homodyne (or hybrid heterodyne) transmitter, local oscillator, and spectrum sensing unit that monitors for interference in channels and bands.

The flexible transceiver architecture is capable of operating in different duplexing operating modes within different frequency bands. This is achieved through signal management by a duplexer at the antenna terminal and unification or sharing of components of the transceiver such as antenna, LOs and frequency converters. This may provide a robust, compact and low cost transceiver and wireless device.

The spectrum sensing unit continuously monitors channels and bands for robust interference detection simultaneously with data communication, which makes the transceiver a spectrum aware architecture. This allows the transceiver to switch to any channel with tolerably low interference should any severe interference disturbs the transceiver performance. If all in band channels are already occupied, the transceiver can switch the mode and make use of the other band. Thereby, the transceiver makes use of resources efficiently.

The transceiver enables LOs to be shared between the transmitter and the receiver in both modes. In addition, the six-port mixers in the receiver requires low power LOs, and hence the transceiver may operate with low power consumption.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combinations thereof.

The following discussion provides many example embodiments. Although each embodiment represents a single combination of inventive elements, all possible combinations of the disclosed elements are considered to include inventive subject matter. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A transceiver comprising:
a spectrum sensing unit configured to select, within a plurality of millimeter wave bands, one or more channels with tolerably low interference and select a duplexing operating mode based on the selected one or more channels, the duplexing operating mode selected from frequency division duplexing and time division duplexing;
a transmitter configured to modulate a transmit signal using a transmit carrier frequency within the selected one or more channels, and using the duplexing operating mode;
a receiver configured to demodulate a receive signal using a receive carrier frequency within the selected one or more channels, and using the duplexing operating mode; and
a duplexer configured to route the transmit signal from the transmitter based on the duplexing operating mode, and the receive signal to the receiver based on the duplexing operating mode.

2. The transceiver of claim 1, wherein the spectrum sensing unit is configured to monitor the channels of the plurality of millimeter wave bands to detect interference or blockers to trigger the selection and adjustment of the transmit carrier frequency and the receive carrier frequency based on the interference or the blockers.

3. The transceiver of claim 1, the plurality of millimeter wave frequency bands comprising V band and E bands, the duplexing operating mode for V band being the time division duplexing and the duplexing operating mode for E bands being the frequency division duplexing.

4. The transceiver of claim 1, wherein the receiver comprises a multiport homodyne receiver.

5. The transceiver of claim 4, wherein the multiport homodyne receiver is a six-port homodyne receiver.

6. The transceiver of claim 1, wherein the transmit carrier frequency corresponds to a working channel of the one or more channels, the spectrum sensing unit being configured to detect interference in the working channel, and, upon detecting interference in the working channel, trigger selection of another channel of the one or more channels, and wherein the other channel corresponds to another transmit carrier frequency for the transmit signal.

7. The transceiver of claim 1, wherein the receive carrier frequency corresponds to a working channel of the one or more channels, the spectrum sensing unit being configured to, upon detecting interference in the working channel, trigger selection of another channel of the one or more channels, and the other channel corresponding to another receive carrier frequency for the receive signal.

8. The transceiver of claim 1, wherein the spectrum sensing unit comprises another receiver and another local oscillator to scan the one or more channels to detect the one or more channels based on a threshold detection value that corresponds to a tolerable level of interference.

9. The transceiver of claim 1, further comprising a local oscillator configured to provide a frequency source for the transmitter for the transmit signal based on the transmit carrier frequency and for the receiver for the receive signal based on the receive carrier frequency, the local oscillator having a plurality of switches, a microwave frequency source for generating an initial signal, a reconfigurable multiplier to operate in different modes based on the frequency band to convert the initial signal to a multiplied signal, a power divider to divide the multiplied signal, the power divider connecting to the receiver and a switch of the plurality of switches that connects to two additional switches of the plurality of switches, one switch of the two additional switches connecting to another switch of plurality of switches that connects to the transmitter and the other switch of the two additional switches connecting to an up converter with a fixed frequency source that connects to a further switch of the plurality of switches that connects to the transmitter, the local oscillator reconfiguring different signal paths using the plurality of switches based on the receive carrier frequency, the transmit carrier frequency, and the duplexing operating mode.

10. The transceiver of claim 1, wherein the duplexer comprises an inter-digital quadruplexer and a single pole three throw switch to reconfigure different signal paths for the transmit signal and the receive signal.

11. The transceiver of claim 1, wherein the duplexer comprises a set of switches and filters, wherein the duplexer reconfigures a plurality of different signal paths using the set of switches and filters for the output transmit signal and the input receive signal, the duplexer separating the transmit signal and the receive signal and provides frequency band filtering.

12. The transceiver of claim 1, wherein the duplexer comprises a circulator and two tunable filters.

13. The transceiver of claim 1, wherein the duplexer comprises a triplexer, a band-pass filter and three two-state switches to reconfigure the different signal paths for the transmit signal and the receive signal.

14. The transceiver of claim 1, wherein the duplexer comprises a triplexer and a diplexer with a shared channel to reconfigure the different signal paths for the transmit signal and the receive signal.

15. The transceiver of claim 1, wherein the transmitter comprises another set of switches to reconfigure different signal paths for the transmit signal, at least one switch of the other set of switches connecting to an up converter with a fixed frequency source.

16. The transceiver of claim 1, wherein the transmitter comprises a mixer, wherein the receiver comprises a multiport mixer, and wherein the local oscillator is shared by the mixer of the transmitter and the multiport mixer of the receiver.

17. The transceiver of claim 16, wherein the multiport mixer is a six-port mixer.

18. The transceiver of claim 1, wherein the receiver comprises a multiport mixer comprising a plurality of output ports, wherein the spectrum sensing unit uses an output port of the plurality of output ports to monitor the channels of each of the plurality of frequency bands to detect the one or more channels.

19. The transceiver of claim 1, wherein the plurality of millimeter wave frequency bands comprises at least three frequency bands.

20. A wireless device comprising:
a transceiver comprising:
a spectrum sensing unit configured to select, within a plurality of millimeter wave bands, one or more channels with tolerably low interference and select a duplexing operating mode based on the selected one or more channels, the duplexing operating mode selected from frequency division duplexing and time division duplexing;
a transmitter configured to modulate a transmit signal using a transmit carrier frequency within the selected one or more channels, and using the duplexing operating mode;
a receiver configured to demodulate a receive signal using a receive carrier frequency within the selected one or more channels, and using the duplexing operating mode; and
a duplexer configured to route the transmit signal from the transmitter based on the duplexing operating mode, and the input receive signal to the receiver based on the duplexing operating mode;
an antenna connected to the transceiver for transmitting the transmit signal and receiving the receive signal; and
a processor and a memory for sending data to the transceiver to generate the transmit signal and receiving and storing data from the transceiver from the receive signal.

21. A method for transmitting and receiving signals within a plurality of millimeter wave frequency bands, the method comprising:
continuously scanning the channels of each of the plurality of frequency bands to select one or more channels with tolerably low interference and select a duplexing operating mode based on the selected one or more channels, the duplexing operating mode selected from frequency division duplexing and time division duplexing;
modulating, using a transmitter, a transmit signal using a transmit carrier frequency within the selected one or more channels, and using the duplexing operating mode;
demodulating, using a receiver, a receive signal using a receive carrier frequency within the selected one or more channels, and using the duplexing operating mode; and
routing, using a duplexer, the transmit signal from the transmitter based on the duplexing operating mode, and the receive signal to the receiver based on the duplexing operating mode.

22. The method of claim 21, wherein the plurality of millimeter wave frequency bands comprise V band and E bands, the duplexing operating mode for V band being time division duplexing and the duplexing operating mode for E bands being frequency division duplexing.

23. The method of claim 22, wherein the transmit carrier frequency corresponds to a working channel of the one or more channels of the transmit frequency band, wherein the step of continuously scanning comprises upon detecting interference in the working channel, triggering selection and adjustment of another channel of the one or more channels, the other channel corresponding to another transmit carrier frequency for the transmit signal.

24. The method of claim 23, wherein the receive carrier frequency corresponds to a working channel of the one or more channels, wherein the step of continuously scanning comprises upon detecting interference in the working channel, triggering selection and adjustment of another channel of the one or more free channels, the other channel corresponding to another receive carrier frequency for the receive signal.

25. The method of claim 22, further comprising providing a frequency source, using a local oscillator, for the transmitter for the transmit signal based on the transmit carrier frequency and the transmit duplexing operating mode and for the receiver for the receive signal based on the receive carrier frequency and the receive duplexing operating mode.

26. A backhaul communication system for wireless devices comprising:
a plurality of base stations in wireless communication, each base station comprising at least one antenna and at least one transceiver for the wireless communication, the at least one transceiver having:
a spectrum sensing unit configured to select, within a plurality of millimeter wave bands, one or more channels with tolerably low interference and select a duplexing operating mode based on the selected one or more channels, the duplexing operating mode selected from frequency division duplexing and time division duplexing;
a transmitter configured to modulate a transmit signal using a transmit carrier frequency within the selected one or more channels, and using the duplexing operating mode;
a receiver configured to demodulate a receive signal using a receive carrier frequency compatiblo within the selected one or more channels, and using the duplexing operating mode; and
a duplexer configured to route the transmit signal from the transmitter based on the transmit duplexing operating mode, and the receive signal to the receiver based on the receive duplexing operating mode.

* * * * *